United States Patent
Fujisawa et al.

(10) Patent No.: US 6,693,851 B1
(45) Date of Patent: Feb. 17, 2004

(54) ELECTRONIC DEVICE AND CONTROL METHOD FOR ELECTRONIC DEVICE

(75) Inventors: Teruhiko Fujisawa, Shiojiri (JP); Makoto Okeya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/743,665

(22) PCT Filed: May 15, 2000

(86) PCT No.: PCT/JP00/03104

§ 371 (c)(1),
(2), (4) Date: Jan. 11, 2001

(87) PCT Pub. No.: WO00/70411

PCT Pub. Date: Nov. 23, 2000

(30) Foreign Application Priority Data

May 14, 1999 (JP) .............................. 11-134961

(51) Int. Cl.⁷ .............................. G04C 3/00; H02J 7/00; G06F 1/32

(52) U.S. Cl. ...................... 368/203; 368/204; 320/121; 320/130; 713/320; 713/321

(58) Field of Search ..................... 368/64–66, 203–205; 320/100–167; 713/320–322

(56) References Cited

U.S. PATENT DOCUMENTS

| | | | | |
|---|---|---|---|---|
| 4,291,266 A | * | 9/1981 | Portmann | 136/293 |
| 4,785,435 A | * | 11/1988 | Inoue et al. | 368/205 |
| 5,592,442 A | * | 1/1997 | Nishikawa et al. | 368/11 |
| 5,754,798 A | * | 5/1998 | Uehara et al. | 710/104 |
| 5,861,818 A | * | 1/1999 | Ohtsuki | 340/7.52 |
| 5,905,914 A | * | 5/1999 | Sakai et al. | 710/67 |
| 5,926,404 A | * | 7/1999 | Zeller et al. | 713/321 |
| 6,061,304 A | * | 5/2000 | Nagata et al. | |
| 6,069,846 A | * | 5/2000 | Nagata | |
| 6,144,621 A | * | 11/2000 | Sase | 368/204 |
| 6,147,936 A | * | 11/2000 | Nakajima | 368/204 |
| 6,201,371 B1 | * | 3/2001 | Kawabe et al. | 320/121 |
| 6,301,198 B1 | * | 10/2001 | Otaka et al. | |

FOREIGN PATENT DOCUMENTS

| | | |
|---|---|---|
| CN | 1107979 A | 9/1995 |
| GB | 2037025 | 7/1980 |
| JP | 9-304555 | 11/1997 |
| JP | 11-223682 | 8/1999 |

* cited by examiner

Primary Examiner—David Martin
Assistant Examiner—Michael L. Lindlinger
(74) Attorney, Agent, or Firm—Mark P. Watson

(57) ABSTRACT

When an electronic timepiece is in a power-saving mode in which the current time display is suspended, it is determined whether or not the charge voltage supplied from a high-capacity capacitor is higher than a predetermined reference voltage, and if higher, enough electrical energy is stored in the high-capacity capacitor to return from the power-saving mode to the display mode, so that a current time restoration process is performed upon detecting power generation. On the other hand, if the charge voltage is less than or equal to the predetermined reference voltage, the supply of the power supply voltage to the control circuits is stopped to prevent the electrical energy stored in the high-capacity capacitor from being consumed needlessly. As a result, the electronic timepiece can be reactivated quickly when the power generating device begins to generate power.

31 Claims, 12 Drawing Sheets

ELECTRONIC DEVICE AND CONTROL METHOD FOR ELECTRONIC DEVICE

BACKGROUND OF THE INVENTION

1. Field of the Invention

The present invention relates to an electronic device and control method for the electronic device, and particularly relates to an electronic device wherein the operating modes of the electronic device can be switched between a drive mode and a power saving mode, and a control method for the electronic device.

2. Description of the Related Art

An example of an electronic device of recent years is the electronic wristwatch. These wristwatches contain a power supply, the power supply including a power generating device having a rotating weight, and a storage unit (e.g. high-capacity capacitor) for storing electrical energy generated by the power generating device. This type of electronic timepiece is capable of operating as a watch for long periods of time without battery replacement because the time display is performed by supplying electrical energy delivered from the capacitor to the time display unit.

In this way, electronic timepieces having power generating devices supply stable electrical energy for long periods of time. Thus, when the power generating device has been in a non-generating state for a predetermined period of time or when the electronic timepiece is removed from the user's wrist, for example, the condition is detected, and the operating mode of the electronic timepiece is switched from an active mode (display mode) in which time display is performed to a power saving mode in which time display is not performed.

Here, in the power saving mode of the electronic timepiece, time display is not performed, and electrical energy is supplied only to a control circuit for keeping track of the current time. On the other hand, in the display mode (active mode) in which the normal time display is performed, not only is electrical energy supplied to the control circuit, but for example in the case of an analog watch, electrical energy is also supplied to the drive circuit for moving the hands.

When a user puts an electronic timepiece that is in power-saving mode onto his wrist and power generation commences, a switch is made from the power-saving mode to the display mode, and in the time display unit, the display is restored to the current time based on the data stored in a counter. For example, in an analog watch using hands, the hands are sped forward to restore it to the current time.

However, when an electronic timepiece continues to be in the power-saving (non-generating period) for a long time, the electrical energy stored in the high-capacity capacitor is gradually consumed. For this reason, when there is very little electrical energy in the high-capacity capacitor, restoration to the current time becomes impossible. Additionally, in this case, a lot of time is required to accumulate enough electrical energy to reactivate the time display unit itself, so that there is a risk to the re-activating ability of the electronic timepiece.

The present invention has been made in consideration of the above-described situation, and offers an electronic device and control method for the electronic device wherein, when there is not enough electrical energy to return to the current time in the power supply during the power-saving mode, the consumption of electrical energy is reduced to preserve the electrical energy of the power supply, thus enabling the driven unit to be quickly reactivated.

SUMMARY OF THE INVENTION

A first embodiment of the present invention is characterized by comprising a chargeable power supply unit for supplying electrical energy, a drive control unit operated by the electrical energy supplied from said power supply unit, for outputting a drive signal; a driven unit driven by said drive signal, a mode switching unit for switching the operating mode of said driven unit between a drive mode for normal operation and a power-saving mode based on a preset first condition; and an operation suspending unit for suspending operation of said drive control unit when the amount of electrical energy stored in said power supply unit is determined to be smaller than a predetermined electrical energy amount based on a preset second condition while in a power-saving mode due to said mode switching unit.

A second embodiment of the present invention is characterized by that in the first embodiment of the present invention said operation suspending unit suspends supply of the electrical energy from said power supply unit to said drive control unit when suspending the operation of said drive control unit.

A third embodiment of the present invention is characterized by that in the first embodiment of the present invention said drive control unit comprises a control circuit operated by electrical energy supplied from said power supply unit, for outputting a control signal, and a drive circuit operated by electrical energy supplied from said power supply unit, for outputting a drive signal to said driven unit based on the control signal, and said mode switching unit supplies electrical energy to said control circuit and drive circuit in said drive mode, and supplies electrical energy to only said control circuit in power-saving mode.

A fourth embodiment of the present invention is characterized by that in the first embodiment of the present invention said power supply unit comprises a power generating unit for converting external energy into electrical energy, and a power storing unit for storing electrical energy supplied from said power generating unit and supplying the electrical energy to said drive control unit.

A fifth embodiment of the present invention is characterized by that in the first embodiment of the present invention said power storing unit comprises an auxiliary battery or a capacitor.

A sixth embodiment of the present invention is characterized by that in the fourth embodiment of the present invention a power generation state detecting unit for detecting whether or not said power generating unit is in a power generation state is provided, and said first condition is whether or not said power generating unit is in a power generating state is determined by said power generation state detecting unit.

A seventh embodiment of the present invention is characterized by that in the sixth embodiment of the present invention said power generation state detecting unit comprises an energy amount determining unit for determining whether or not the amount of electrical energy output from said power generating unit exceeds a criterion energy amount, and a power generation time determining unit for determining whether or not a duration over which the electrical energy amount is determined by said energy amount determining unit as to exceed the criterion energy amount exceeds a criterion time value.

An eighth embodiment of the present invention is characterized by that in the first embodiment of the present invention a carriage state detecting unit for detecting whether or not said electronic device is in a carried state is provided, and said first condition requires, for switching the operating mode of said driven unit from said drive mode to said power-saving mode, that when said electronic device is found to be in a non-carried state by said carriage state detecting unit, and the duration over which the electronic device is in a non-carried state continues for a predetermined time, and said first condition requires, for switching the operating mode of said driven unit from said power-saving mode to said drive mode, that when the electronic device has switched from a non-carried state to a carried state according to said carriage state detecting unit.

A ninth embodiment of the present invention is characterized by that in the first embodiment of the present invention a voltage detecting unit for detecting the voltage of said power supply unit is provided, and said second condition requires that the voltage of said power supply unit detected by said voltage detecting unit goes below a predetermined voltage.

A tenth embodiment of the present invention is characterized by that in the first embodiment of the present invention an electrical energy detecting unit for detecting the amount of electrical energy supplied from said power supply unit is provided, and said second condition requires that the amount of electrical energy capable of being supplied by said power supply unit detected by said electrical energy amount detecting unit becomes smaller than a predetermined amount of electrical energy required to restore the operating mode of said drive unit from said power-saving mode to said drive mode.

An eleventh embodiment of the present invention is characterized by that in the fourth embodiment of the present invention a power generation state detecting unit for detecting whether or not said power generating unit is in a power generating state is provided, an operation initiating unit for initiating operation of said drive control unit when a preset third condition is fulfilled while the operation of said drive control unit is in a suspended state due to said operation suspending unit is provided, and said third condition requires that initiation of power generation by said power generating unit is detected by said power generation state detecting unit.

A twelfth embodiment of the present invention is characterized by that in the eleventh embodiment of the present invention the initiation of power generation of said third condition means that when the amount of electrical energy output from said power generating unit exceeds an energy amount sufficient for reactivation, and this state continues for a predetermined duration.

A thirteenth embodiment of the present invention is characterized by that in the first embodiment of the present invention a carriage state detecting unit for detecting whether or not said electronic device is in a carried state is provided, an operation initiating unit for initiating operation of said drive control unit based on a preset third condition when the operation of said drive control unit is in a suspended state due to said operation suspending unit is provided, and said operation initiating unit determines when said electronic device is switched from a non-carried state to a carried state by said carriage state detecting unit as said third condition.

A fourteenth embodiment of the present invention is characterized by that in the thirteenth embodiment of the present invention the switch from said non-carried state to the carried state is made when the carried state continues for a predetermined duration after switching from a non-carried state to a carried state.

A fifteenth embodiment of the present invention is characterized by that in the first embodiment of the present invention an external operation input unit for a user to perform operations from the outside is provided, and the switch from said drive mode to said power-saving mode is performed by said mode switching unit based on the operating conditions of said external operation input unit.

A sixteenth embodiment of the present invention is characterized by that in the first embodiment of the present invention an external operation input unit for a user to perform operations from the outside is provided, and an operation initiating unit for initiating operation of said drive control unit based on operating conditions of said external operation input unit when said operation suspending unit detects that the operations of said drive control unit are in a suspended state is provided.

A seventeenth embodiment of the present invention is characterized by that in any one of the first to sixteenth embodiments of the present invention said driven unit has a time display unit for displaying the time.

An eighteenth embodiment of the present invention is characterized by that in the seventeenth embodiment of the present invention said drive control unit comprises a current time restoring unit for restoring the time display to the current time when the operating mode of the driven unit is switched from said power-saving mode to said drive mode by the mode switching unit.

A nineteenth embodiment of the present invention is characterized by that in the eighteenth embodiment of the present invention an electronic device said predetermined electrical energy amount is set to an electrical energy amount required to restore the current time from the power-saving mode using said current time restoring unit.

A twentieth embodiment of the present invention is characterized by that in the eighteenth embodiment of the present invention the amount of energy sufficient to perform restoration is set to a minimum amount required to enable time display using said time display unit by initiating the operation of said drive control unit.

A twenty-first embodiment of the present invention is characterized by that in the eighteenth embodiment of the present invention said time display unit has hands for displaying the time and a motor for driving said hands, and said current time restoring unit restores the motion of the hands by said motor by restoring them at a high-speed hand-moving speed which is higher than the normal hand-moving speed.

A twenty-second embodiment of the present invention is characterized by that in the first embodiment of the present invention said drive control unit comprises a control circuit operated by electrical energy supplied from said power supply unit, for outputting a control signal, and a drive circuit operated by electrical energy supplied from said power supply unit, for receiving the control signal and outputting a drive signal to said driven unit, said control circuit comprises an oscillator circuit for generating a reference pulse, and said operation suspending unit suspends the operation of said oscillator circuit.

A twenty-third embodiment of the present invention is characterized by that in the twenty-second embodiment of the present invention said operation suspending unit suspends the supply of electrical energy to said oscillator circuit.

A twenty-fourth embodiment of the present invention is characterized by that in the first embodiment of the present invention said drive control unit comprises a control circuit operated by electrical energy supplied from said power supply unit, for outputting a control signal, and a drive circuit operated by electrical energy supplied from said power supply unit, for receiving the control signal and outputting a drive signal to said driven unit, said control circuit comprises an oscillator circuit for generating a reference pulse, and a divider circuit for dividing the reference pulse output from said oscillator circuit, and said operation suspending unit suspends operation of said oscillator circuit or said divider circuit.

A twenty-fifth embodiment of the present invention is characterized by that in the twenty-fourth embodiment of the present invention said operation suspending unit comprises a regulated voltage generating circuit for generating a constant voltage lower than the power supply voltage for driving at least one of the oscillator circuit and the divider circuit, and suspends the supply of electrical energy to said regulated voltage generating circuit.

A twenty-sixth embodiment of the present invention is characterized by a control method for an electronic device comprising a chargeable power supply unit for supplying electrical energy, a drive control unit operated by the electrical energy supplied by said power supply unit, for outputting a drive signal, and a driven unit driven by receiving the drive signal output from said drive control unit, the control method comprising a mode switching step of switching an operating mode of said driven unit between a drive mode and a power-saving mode based on a preset first condition, and a drive suspending step of suspending operation of said drive control unit when the amount of electrical energy stored in said power supply unit is determined to be smaller than a predetermined amount of electrical energy according to a preset second condition, while the operation mode is set to the power-saving mode by said mode switching step.

A twenty-seventh embodiment of the present invention is characterized by that in the twenty-sixth embodiment of the present invention said power supply unit comprises a power generating device for converting external energy into electrical energy, and a power storing device for storing electrical energy supplied from said power generating device and supplying said electrical energy to said drive control unit, the method further comprising a generation state detecting step of determining whether or not power is being generated by said power generating device, and wherein said first condition is whether or not power is being generated by said power generating device according to said power generation state detecting step.

A twenty-eighth embodiment of the present invention is characterized by that in the twenty-seventh embodiment of the present invention said power generation state detecting step comprises an energy amount determining step for determining whether or not the amount of electrical energy output from said power generating device has exceeded a criterion energy amount, and a power generation time determining step of determining whether or not the duration over which the electrical energy amount exceeding the criterion energy amount is determined in said energy amount determining step exceeds a criterion time value.

A twenty-ninth embodiment of the present invention is characterized by that in the twenty-sixth embodiment of the present invention said electronic device has a carriage state detecting step for detecting whether or not it is being carried, said first condition requires, for switching the operating mode of said driven unit from said drive mode to said power-saving mode, that said electronic device is detected to be in a non-carried state in said carriage state detecting step, and the time over which said electronic device is in a non-carried state continues for a predetermined time, and said first condition requires, for switching the operating mode of said drive unit from said power-saving mode to said drive mode, that a switch from the non-carried state to a carried state is detected in said carriage state detecting step.

A thirtieth embodiment of the present invention is characterized by further comprising, in the twenty-sixth embodiment of the present invention, an electrical energy amount detecting step for detecting an amount of electrical energy supplied from said power supply unit, and said second condition is when the electrical energy amount capable of being supplied by said power supply unit detected by said electrical energy detecting step is smaller than a predetermined electrical energy amount required to restore the operating mode of said driven unit from said power-saving mode to said drive mode.

A thirty-first embodiment of the present invention is characterized by that in the twenty-sixth embodiment of the present invention said power supply unit comprises a power generating device for converting external energy into electrical energy, and a power storing device for storing electrical energy supplied from said power generating device, and supplying said electrical energy to said drive control unit, the method comprises a power generation state detecting step of detecting whether or not said power generating device is in a power generation state, and further comprises an operation initiating step of initiating operation of the drive control unit based on a preset third condition when the operation of said drive control unit being in a suspended state is determined in said operation suspending step, and said third condition requires that said power generating device initiating power generation is detected in said power generation state detecting step.

A thirty-second embodiment of the present invention is characterized by that in the twenty-sixth embodiment of the present invention said power supply unit comprises a power generating device for converting external energy into electrical energy, and a power storing device for storing electrical energy supplied from said power generating device, and supplying said electrical energy to said drive control unit, said method comprises a carriage state detecting step for detecting whether or not said electronic device is in a carried state, and further comprises an operation initiating step of initiating operation of the drive control unit based on a preset third condition when the operation of said drive control unit is in a suspended state due to said operation suspending step, said third condition requires that when said electronic device is detected as having switched from a non-carried state to a carried state in said carriage state detecting step.

DETAILED DESCRIPTION

Next, preferred modes for carrying out the invention shall be described with reference to the drawings.

1 Structural Arrangement

Figure 1:
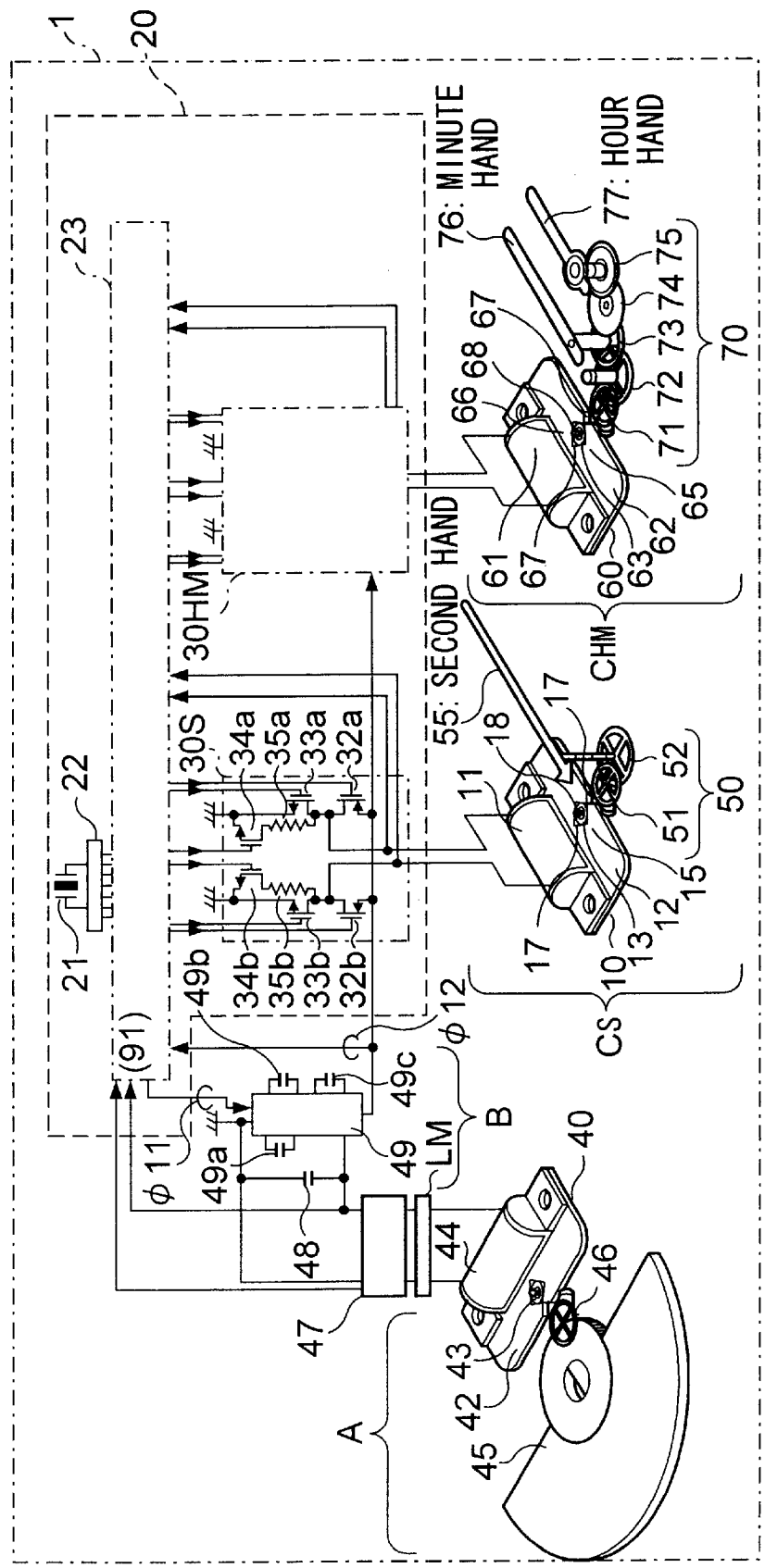
FIG. 1 is a diagram showing the schematic structure of an electronic timepiece according to an embodiment of the present invention.

FIG. 1 is a schematic illustration of the structure of an electronic timepiece 1 according to one embodiment.

The electronic timepiece 1 is a wristwatch, used by strapping a band connected to the device itself around the wrist of a user.

Figure 2:
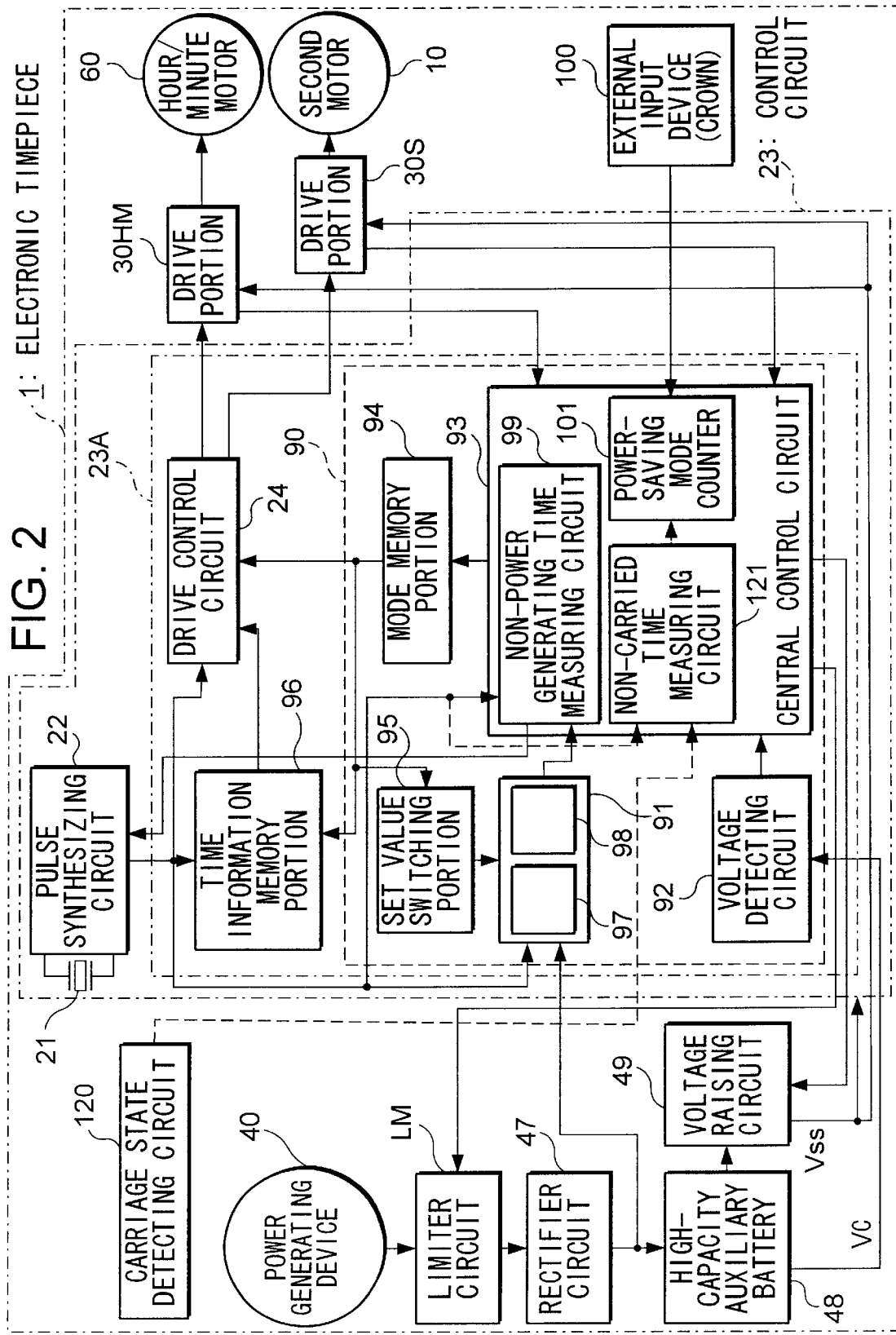
FIG. 2 is a functional block diagram showing a control circuit and peripheral circuits according to the same embodiment.

The electronic timepiece 1 according to the present embodiment comprises a power generating unit A, power supply unit B, a power generation state detecting unit 91 (see FIG. 2), a control circuit 23, a second hand moving mechanism CS, an hour-minute hand moving mechanism CHM, an hour-minute hand drive unit 30HM, a second hand drive unit 30S and an external input device 100, e.g. a crown (see FIG. 2).

The power generating unit A generates AC power. The power supply unit B rectifies the AC voltage output from the power generating unit A, raises the rectified voltage, stores the raised voltage and supplies the mechanical units with electrical energy. The power generation state detecting unit 91 (see FIG. 2) detects the state of power generation of the power generating unit A. The control circuit 23 controls the entire device based on detected results output from the power generation state detecting unit 91. The second hand moving mechanism CS drives the second hand 55 using a stepping motor 10. The hour-minute hand moving mechanism CHM drives the minute and hour hands using a stepping motor. The second hand drive unit 30S receives the control signals output from the control circuit 23 and drives the second hand moving mechanism CS. The hour-minute hand drive unit 3OHM receives the control signals output from the control circuit 23 and drives the hour-minute hand moving mechanism CHM. The external input device 100 (see FIG. 2) performs an instruction operation for transferring the operating mode of the electronic timepiece 1 from a time display mode to a calendar correcting mode, a time correcting mode or forcibly to a power-saving mode, to be described below.

The control circuit 23 switches between a display mode (operating mode) for performing a time display and a power-saving mode by supplying power to the drive units 30S, 30HM (drive circuits) of the hand moving mechanisms CS, CHM according to the power generation state of the power generating unit A. The power-saving mode is a mode that suspends the power supply to the second hand moving mechanism CS and the hour-minute hand moving mechanism CHM and supplys power to only the control circuit 23. Additionally, when a user picks up the electronic timepiece 1 and shakes it to generate power, and if it is detected that the generation voltage exceeds a predetermined voltage, the control circuit 23 switches the mode from the power-saving mode to the display mode.

2 Detailed Structure

The various component parts of the electronic timepiece 1 shall be described below. The control circuit 23 shall be explained later using functional blocks.

2.1 Power Generating Unit

First, the power generating unit A shall be described.

The power generating unit A comprises a power generating device 40, a rotating weight 45 and a step-up gear 46.

Power generating device 40 employs an electromagnetic induction type AC power generating device capable of supplying to the outside power induced in a power generating coil 44 connected to a power generating stator 42 due to rotation of a power generating rotor 43 inside the power generating stator 42.

Additionally, the rotating weight 45 functions as an element for transmitting kinetic energy to the power generating rotor 43. The movement of the rotating weight 45 is transmitted through the step-up gear 46 to the power generating rotor 43.

In the wristwatch type electronic timepiece 1, this rotating weight 45 is capable of turning inside the device in response to the movement of the user's wrist, thus acquiring kinetic energy by taking advantage of external energy arising in the course of the user's daily life. The power generating device 40 generates power using this kinetic energy, and drives the electronic timepiece 1 using this power.

2.2 Power Supply Unit

Next, the power supply unit B shall be described.

The power supply unit B comprises a limiter circuit LM, a rectifying circuit 47, a high-capacity capacitor 48 and a voltage raising/lowering circuit 49. The limiter circuit LM prevents excessive voltages from being applied to latter-stage circuits. The rectifying circuit 47 is a half-wave rectifying circuit or full-wave rectifying circuit composed of Schottky diodes, silicon diodes, parasitic diodes of MOSFETs in IC's, which are commonly known, or functional elements using switching devices such as transistors.

The voltage raising/lowering circuit 49 is constructed using a plurality of capacitors 49a, 49b and 49c. It receives a charged voltage Vc from the high-capacity capacitor 48, performs in multiple stages voltage raising or lowering operations on the received voltage Vc, and outputs a power supply voltage Vss which is to be a low potential side voltage. Then, the voltage raising/lowering circuit 49 raises or lowers the charge voltage Vc to the power supply voltage Vss according to the control signal φ11 output from the control circuit 23, and supplies this power supply voltage Vss to the integrated circuit unit 23A of the control circuit 23, the pulse synthesizing circuit 22 and the second hand drive unit 30S and hour-minute hand drive unit 30MH, as shown in FIG. 2, for example.

Here, the power supply unit B takes Vdd (high potential side voltage) as the reference potential (GND), and outputs Vss (low potential side voltage) as the power supply voltage.

2.3 Hand Moving Mechanism

Next, the hand moving mechanisms CS and CHM shall be described.

2.3.1 Second Hand Moving Mechanism

First, the second hand moving mechanism CS shall be described.

The stepping motor 10 used in the second hand moving mechanism CS is also called a pulse motor, a step motor or a, digital motor, which are often used as actuators in digital control devices. The stepping motor 10 is driven by a pulse signal. In recent years, this type of stepping motor, which has been made more compact in size and light in weight for use as actuators in compact electronic devices or information devices suitable for carrying, has been widely employed. Typical of these types of electronic devices are electronic timepieces, time switches and chronographs.

The stepping motor 16 of the present embodiment comprises a drive coil 11 which generates magnetic force by means of a drive pulse supplied from the second hand drive unit 30S, a stator 12 which is excited by the drive coil 11 and a rotor 13 which is rotated by the magnetic field induced inside the stator 12.

Additionally, the rotor 13 is of the PM type (permanent magnet rotating type) having a disc-shaped bipolar permanent magnet. The stator 12 is provided with magnetic saturation portions 17 and the phases (poles) 15 and 16 around the rotor 13 by the different magnetic poles are generated by the magnetic force generated by the drive coil 11.

Furthermore, in order to define the direction of rotation of the rotor 13, an inner notch 18 is provided at a suitable position on the inside circumference of the stator 12, and a cogging torque is generated to stop the rotor 13 at a suitable position.

The rotation of the rotor 13 due to the stepping motor 10 is transmitted to the second hand 55 by means of the gear train 50 comprising the second intermediary gear 51 which is engaged with the rotor 13 and the second gear (second indicating gear) 52, thus enabling the second hand 55 to indicate the seconds.

2.3.2 Hour-Minute Hand Moving Mechanism

Next, the hour-minute hand moving mechanism CHM shall be described. The stepping motor 60 used in the hour-minute hand moving mechanism CHM has roughly the same structure as the stepping motor 10.

The stepping motor 60 of the present embodiment comprises a drive coil 61 for generating magnetic force in response to a drive pulse supplied from the hour-minute hand drive unit 3OHM, a stator 62 which is excited by the drive coil 61 and a rotor 63 which rotates according to the magnetic field induced inside the stator 62.

Additionally, the rotor 63 is of the PM type (permanent magnet rotating type) having a disc-shaped bipolar permanent magnet. Furthermore, the stator 62 is provided with a magnetic saturation portion 67 generated at the respective phases (poles) 65 and 66 around the rotor 63 by the different magnetic poles due to the magnetic force generated by the drive coil 61.

Furthermore, in order to define the direction of rotation of the rotor 63, an inner notch 68 is provided at a suitable position on the inside circumference of the stator 62, and a cogging torque is generated to stop the rotor 63 at a suitable position.

The rotation of the rotor 63 of the stepping motor 60 is transmitted to the hands through the gear train 70 comprising the number four gear 71 which is engaged with the rotor 63, the number three gear 72, the number two gear (minute indicating gear) 73, the minute gear 74 and the cylindrical gear (hour indicating gear) 75. The minute hand 76 is connected to the number two gear 73, and the hour hand 77 is connected to the cylindrical gear 75. The hour and minute are indicated by these hands moving in conjunction with the rotation of the rotor 63.

In the gear train 70, it is of course also possible to connect a transmission system (for example, in order to display the date, a cylindrical intermediary gear, a daily rotating intermediary gear, a daily rotating gear and a day gear), not shown, for displaying the date (calendar). In this case, a calendar correcting gear train (for example, a first calendar correction transmitting gear, a second calendar correction transmitting gear, a calendar correcting gear and a day gear) can be additionally provided.

2.4 Second hand Drive Unit and Hour-Minute Hand Drive Unit

Next, the second hand drive unit 30S and hour-minute hand drive unit 3OHM shall be described. Here, since the structure of the second hand drive unit 30S and hour-minute hand drive unit 3OHM are identical, only the second hand drive unit 30S shall be described with reference to FIG. 1.

The second hand drive unit 30S supplies the stepping motor 10 with various drive pulses under the control of the control circuit 23.

Additionally, the second hand drive unit 30S comprises a bridge circuit composed of a serially connected P-channel transistor 33a and N-channel transistor 32a connected, and a P-channel transistor 33b and N-channel transistor 32b. The second hand drive unit 30S comprises rotation detecting resistors 35a and 35b respectively connected in parallel with the transistors 33a and 33b, and sampling P-channel transistors 34a, 34b for supplying chopper pulses to the resistors 35a and 35b.

As a result, the second hand drive unit 30S supplies drive pulses of different polarities to the drive coil 11, or supplies detecting pulses for generating an induction voltage for detecting rotation of the rotor 13 and detecting the magnetic field, by applying control pulses of different polarity and pulse width at various timings from the control circuits 23 to the gate electrodes of the transistors 32a, 32b, 33a, 33b, 34a and 34b.

2.5 Control Circuit

Next, the structure of the control circuit 23 shall be explained with reference to FIG. 2; wherein the functional block diagram of FIG. 2 shows the control circuit 23 and connecting functional units.

The control circuit 23 comprises a pulse synthesizing circuit 22, a mode setting unit 90, a time information memory unit 96, a drive control circuit 24 and the like. Additionally, the mode setting unit 90, time information memory unit 96, drive control circuit 24 and the like are mounted on a chip and constitute a Vss drive unit 23A driven by the power supply voltage Vss, the power supply voltage Vss of the voltage raising/lowering circuit 49 being supplied to the Vss drive unit 23A. Furthermore, a constant voltage output from the regulated voltage generating circuit (not shown) is supplied to the pulse synthesizing circuit 22. The regulated voltage generating circuit receives the power supply voltage Vss and generates a stable constant voltage.

Additionally, the pulse synthesizing circuit 22 comprises an oscillator circuit for generating a reference pulse with a stable frequency using a reference oscillation source 21 such as a quartz resonator, a dividing circuit for dividing the reference pulse, and a synthesizing circuit for generating pulses having different pulse widths and waveforms by combining the divided pulses and the reference pulse. A constant voltage is supplied to the pulse generating circuit 22. This constant voltage is generated by the regulated voltage circuit (not shown) which receives the power supply voltage Vss (charge voltage Vc) output from the power supply unit B and outputs a constant voltage. On the other hand, the pulse synthesizing circuit 22 suspends the generation of the pulse signals when the supply of the power supply voltage (constant voltage) is suspended, thus suspending the operation of the entire control circuit 23.

Next, the mode setting unit 90 comprises a power generation state detecting unit 91, a set value switching unit 95 for switching set values used for detection of the power generation state, a voltage detecting circuit 92 for detecting the charge voltage Vc of the high-capacity capacitor 48, a central control circuit 93 for controlling the time display mode according to the power generation state and controlling the voltage gain based on the charge voltage Vc, and a mode memory unit 94 for storing the mode.

This power generation state detecting unit 91 comprises a first detecting circuit 97 and a second detecting circuit 98. The first detecting circuit 97 determines whether or not power is being generated by comparing the generated voltage Vgen of the power generating device 40 and a set voltage value V0. The second detecting circuit 98 determines whether or not a stable power generation state has been achieved by measuring the time over which the power generating device 40 is determined by the first detecting circuit 97 to be in a power generating state as the power generation maintenance time Tgen, and comparing this time Tgen with a set time value T0.

Figure 10:
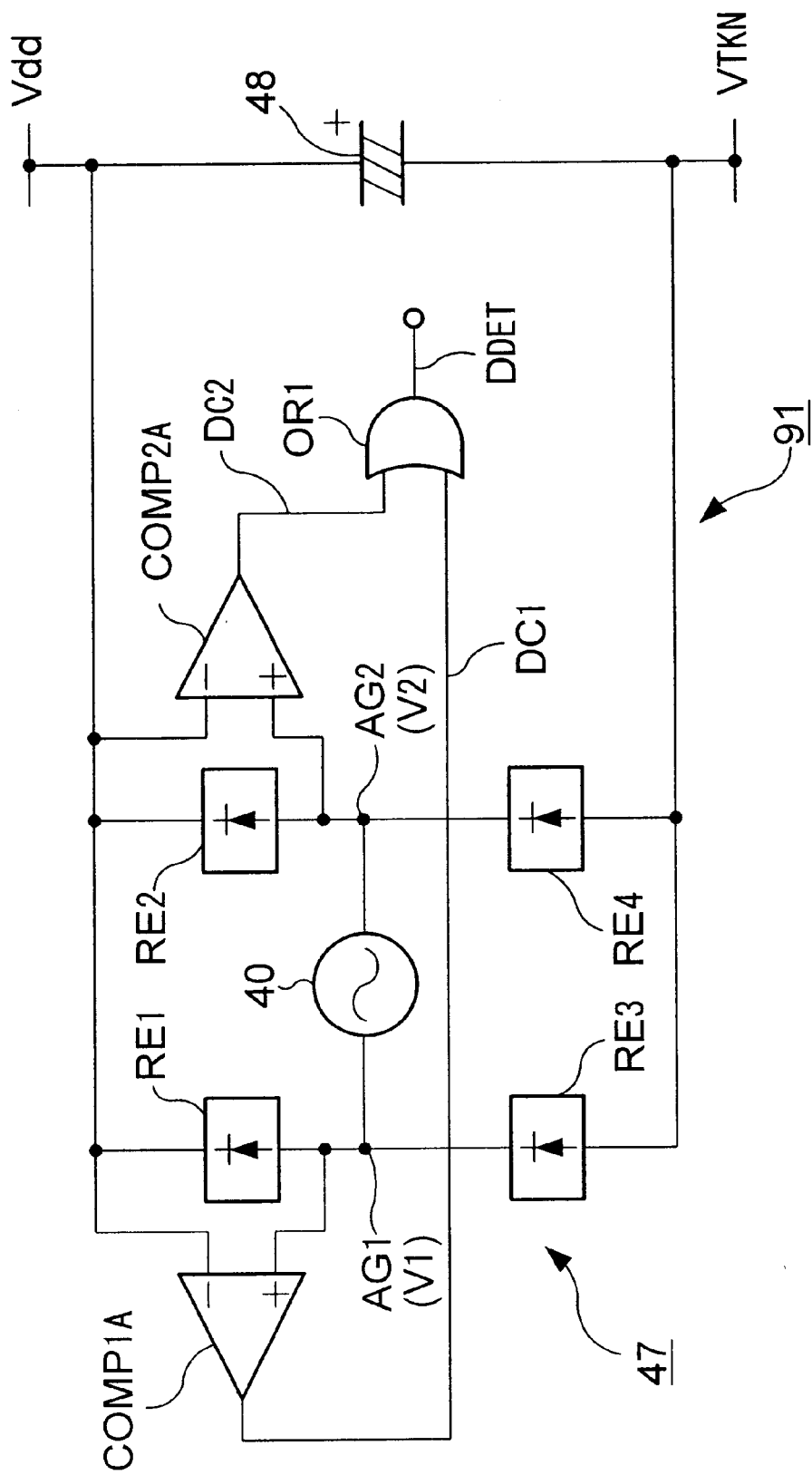
FIG. 10 is a schematic structural diagram of a power generation detecting circuit.

The specific circuit structure of the power generation state detecting unit 91 shall be explained with reference to FIG. 10. FIG. 10 is a circuit structure example of the power generation state detecting circuit and peripheral circuits when full-wave rectification is being performed.

FIG. 10 shows the power generation state detecting unit 91, and as peripheral circuits of the power generation state detecting unit 91, a power generating device 40 and a high-capacity auxiliary power supply 48. Here, the power generating device 40 generates AC power. The high-capacity auxiliary power supply 48 accumulates energy by a DC current output from a rectifying circuit 47 which rectifies the AC current output form the power generating device 40 to convert it to a DC current.

The power generation state detecting unit 91 comprises a first comparator COMPIA, a second comparator COMP2A and an OR circuit OR1. The first comparator COMPIA compares the voltage V1 of the first output terminal AG1 of the power generating device 40 and the high potential side terminal voltage VDD of the high-capacity auxiliary power supply 48, and outputs first comparison result data DC1. The second comparator COMP2A compares the voltage V2 of the second output terminal AG2 of the power generating device 40 and the high potential side terminal voltage VDD of the high-capacity auxiliary power supply 48, and outputs second comparison result data DC2. The OR circuit OR1 takes the logical sum of the first comparison result data DC1 and the second comparison result data DC2, and outputs the result as power generation detection data DDET.

The power generation state detecting unit 91, upon power generation by the power generating device 40, discriminates whether or not sufficient power generation is being performed to charge the high-capacity auxiliary power supply 48 based on the power generation state of the power generating device 40 and the operating state of the limiter circuit LM, and outputs power generation detection data DDET having a frequency in accordance with the power generation period to the central control circuit 93.

Figure 3:
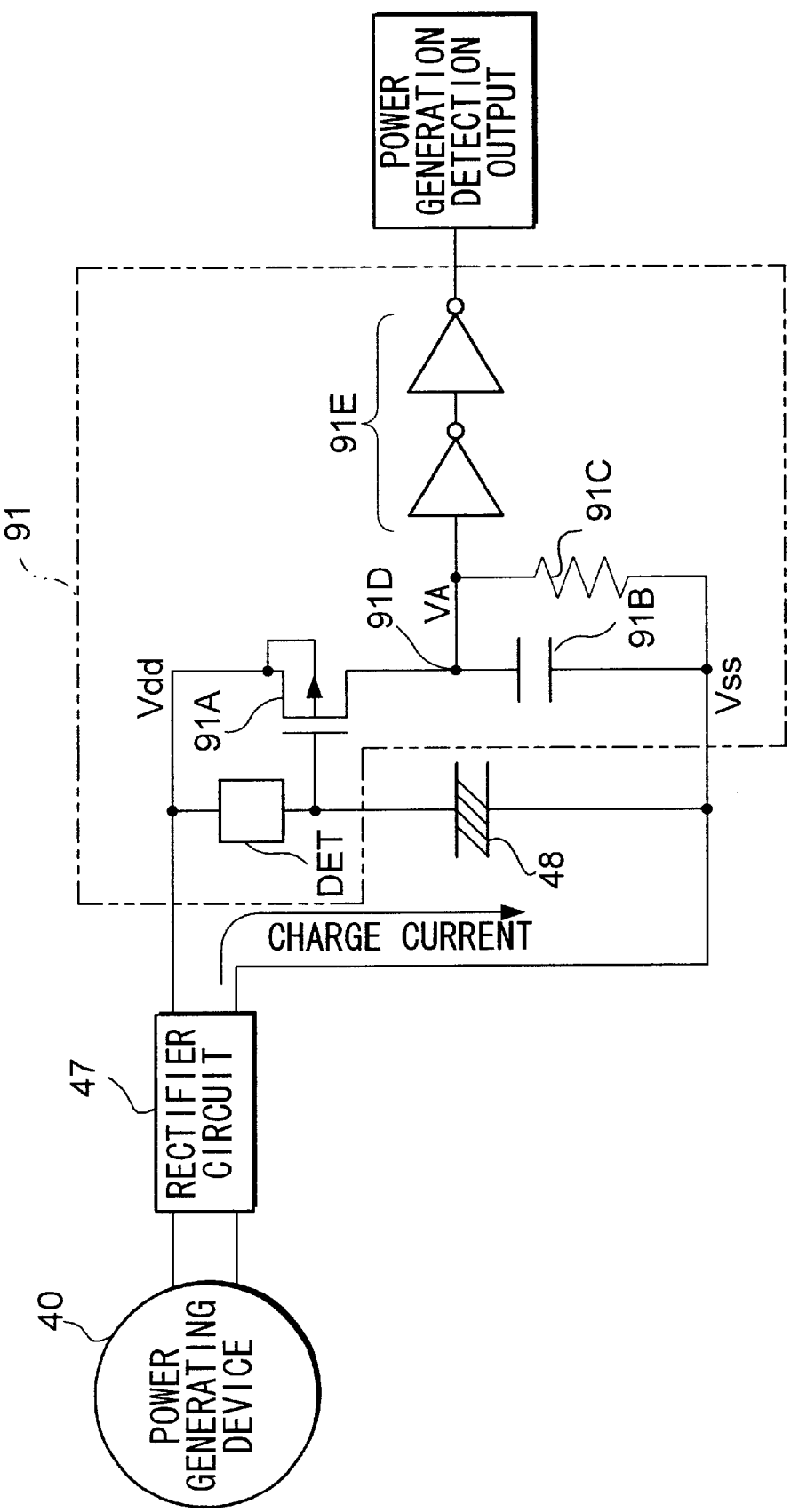
FIG. 3 is a circuit diagram showing the specifics of a power generation state detecting unit.

Next, other specific circuit structures of the power generation state detecting unit 91 shall be described with reference to FIG. 3. This power generation state detecting circuit unit 91 comprises a transistor 91A, a capacitor 91B, a pull-down resistor 91C, a detecting inverter 91E and a charge current detecting circuit DET. The transistor 91A and capacitor 91B are serially connected between the signal line having the high potential side voltage Vdd and the signal line having the low potential side voltage Vss. The pull-down resistor 91C is connected to both ends of the capacitor 91B. The detecting inverter 91E is connected to the connection point 91D between the transistor 91A and the capacitor 91B. The charge current detecting circuit DET is connected between the positive side of the high-capacity capacitor 48 and Vdd.

When a power generation current flows from the rectifying circuit 47 to the high-capacity capacitor 48, a current also flows to the charge current detecting circuit DET. For example, when the charge current detecting circuit DET is constructed of diodes, a forward voltage VF is generated. When this forward voltage VF is greater than the threshold voltage Vth of the transistor 91A, the transistor 91A is turned on and the capacitor 91B is charged. Furthermore, when the voltage VA of the connection point 91D goes from the low potential side voltage Vss to approach the high potential side voltage Vdd, this state is maintained to some degree by the pulldown resistor 91C, whereby the potential of the voltage VA exceeds the threshold value of the detecting inverter 91E and the output switches from an "L" to an "H".

By constructing the power generation state detecting unit 91 in this way, the set voltage value V0 and set time value T0 to be explained are set by appropriately selecting the threshold voltage Vth of the transistor 91A, the pull-down resistor 91C and also the threshold value of the detecting inverter 91, to detect the power generation state of the power generating device 40.

Then, if the conditions of both the first detection circuit 97 and the second detection circuit the power generation state detecting unit 91, the power generating unit A is judged to be in a power generating state. Here, the set voltage value V0 is a negative voltage when Vdd (=GND) is taken as the reference, and indicates the voltage difference from Vdd.

The set voltage value V0 used in the first detection circuit 97 is switch-controlled by the set value switching unit 95, the set value switching unit 95 changing the set voltage value V0 used in the first detection circuit 97 when the display mode is switched to the power-saving mode. That is, in the present example, the set voltage value is Va when in the display mode, and the set voltage value is Vb when in the power-saving mode, their relationship being set as Va<Vb. Consequently, considerable power generation is necessary to switch from the power-saving mode to the display mode. The set value switching unit 95 can also be made to switch the set time value T0 used in the second detection circuit 98.

Figure 11:
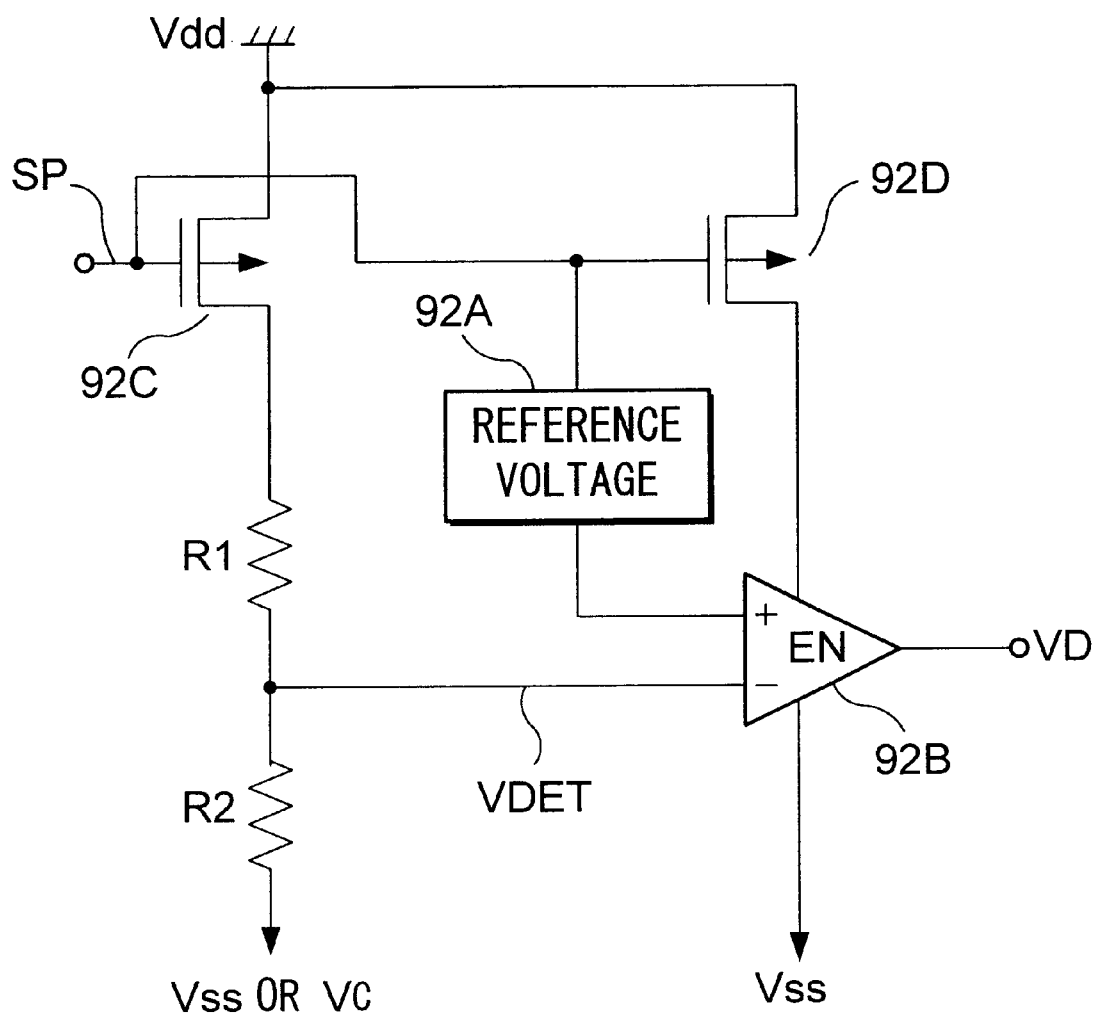
FIG. 11 is a schematic structural diagram of a voltage detecting circuit.

An example of the voltage detecting circuit 92 shall be described with reference to FIG. 11.

The voltage detecting circuit 92 comprises resistors R1, R2, a reference voltage generating unit 92A, a comparator 92B, a first P-channel MOS transistor 92C and a second P-channel MOS transistor 92D. The serially connected resistors R1 and R2 divide the voltage between the high potential side power supply VDD and the low potential side power supply VSS with a predetermined voltage division ratio to generate a detection voltage VDET. The reference voltage generating unit 92A generates a predetermined reference voltage VREF from the high potential side power supply VDD. The comparator 92B compares the detection voltage VDET which is the voltage at the connection point between the resistor R1 and the resistor R2 with the reference voltage VREF, and outputs voltage detection data VD to the central control circuit 93. The first P-channel MOS transistor 92C is turned on at the voltage detection timing by the sampling signal SP (at level "L" on detection) output from the central control circuit 93 and supplies a current to the resistors R1, R2. The second P-channel MOS transistor 92D is turned on at the voltage detection timing by the sampling signal SP (at level "L" on detection) output from the central control circuit 93, putting the enable terminal EN of the comparator 92B at the level "H" to put the comparator 92B into an operating state.

When an "L" level sampling signal SP is input to the voltage detecting circuit 92 from the central control circuit 93, the first P-channel MOS transistor 92C and the second P-channel MOS transistor 92D are turned on.

As a result, power is supplied to the resistors R1, R2, and the resistors R1, R2 divide the voltage between the high potential side power supply VDD and the low potential side power supply VSS at a predetermined dividing ratio to generate a detection voltage VDET which is applied to the inverse input terminal of the comparator.

On the other hand, the enable terminal EN of the comparator 92B also goes to "H" level, and the comparator 92B compares the detection voltage VDET and the reference voltage VREF, and then outputs the voltage detection data DV to the central control circuit 93.

Additionally, the central control circuit 93 comprises a power non-generating time measuring circuit 99 for measuring the power non-generating time Tn during which power generation is not detected at the detection circuits 97, 98, and if the power non-generating time Tn continues for at least a predetermined set period of time, then a switch is made from the display mode to the power-saving mode (first condition).

On the other hand, the restoration from the power-saving mode to the display mode is performed when the power generation state detecting unit 91 detects that the power generating unit A is in a power generating state, and enough electrical energy remains in the charge voltage Vc of the high-capacity capacitor 48 to return from the power-saving mode to the display mode (first condition).

However, if the limiter circuit is operating (on) while in the power-saving mode, a short circuit which is different from the normal charging path is formed, thus short-circuiting the power generating unit A, making it impossible for the power generation state detecting unit 91 to detect when the power generating unit A is in a power generating state, and impossible to make the transfer from the power-saving mode to the display mode.

Therefore, in the present embodiment, when in the power-saving mode, the limiter circuit is turned off (open) regardless of the power generation state of the power generating unit A, and the power generation state detecting unit 91 is enabled to reliably detect the power generation state of the power generating unit A.

Additionally, since the power supply unit B of the present embodiment comprises a voltage raising/lowering circuit 49, it is possible to drive the hand moving mechanisms CS, CHM by raising the power supply voltage using the voltage raising/lowering circuit 49 even if the charge voltage Vc is somewhat low.

On the other hand, if the charge voltage Vc is somewhat high, and higher than the drive voltages of the hand moving mechanisms CS, CHM, the hand moving mechanisms CS, CHM can be driven by lowering the power supply voltage using the voltage raising/lowering circuit 49 to lower the power supply voltage. To this end, the central control circuit 93 determines the voltage raising/lowering factor based on the charge voltage Vc to control the voltage raising/lowering circuit 49.

However, if the charge voltage Vc is too low, it is not possible to obtain a power supply voltage sufficient to operate the hand moving mechanisms CS, CHM even if the voltage is raised. If a transfer is made from the power-saving mode to the display mode in such a case, it is not possible to perform an accurate time display, and power is needlessly expended.

Therefore, in the present embodiment, it is determined whether the charge voltage Vc is sufficient by comparing the charge voltage Vc with a predetermined set voltage value Vb, and this is made the first condition for transferring from the power-saving mode to the display mode.

Furthermore, the central control circuit 93 comprises a power-saving mode counter 101 for monitoring whether or not a preset instruction operation for forcible transfer to the power-saving mode has been performed within a predetermined time, if the external input device 100 is operated by the user or if a power non-generating state is detected by the power generation detecting unit 91.

The mode set in this way is stored in the mode memory unit 94, and the information is supplied to the drive control circuit 24, the time information memory unit 96 and the set value switching unit 95.

Here, when switching from the display mode to the power-saving mode, the drive control circuit 24 suspends the supply of the control signal to the second hand drive unit 30S and the hour-minute hand drive unit 3OHM. As a result, the motors, 10, 60 stop rotating, thus suspending the time display.

Furthermore, the central control circuit 93 has the function of an operation suspending means or unit for suspending the supply of voltage from the power supply unit B to the control circuit 23 and drive units 30S, 30HM when the power supply voltage has become lower than a predetermined amount of electricity necessary to return from the power-saving mode to the display mode by a procedure described below.

Then, by means of this procedure, the electrical discharge from the high-capacity capacitor 48 can be reduced even when enough electrical energy remains in the high-capacity capacitor 48 to return from the power-saving mode to the display mode, thus considerably eliminating unnecessary expenditure of electrical charge.

The time information memory unit 96 is more specifically composed of an up-down counter (not shown), such that after switching from the display mode to the power-saving mode, it receives a reference signal generated by the pulse synthesizing circuit 22, begins measuring time, increments the count value (up-count), and measures the duration of the power-saving mode as the count value.

Additionally, upon switching from the power-saving mode to the display mode, the up-down counter decrements the count value (down-count), and during the down-count, outputs an acceleration pulse supplied from the drive control circuit to the second hand drive unit 30S and hour-minute drive unit 3OHM.

Then, when the count value of the up-down counter goes to zero, i.e. the power-saving mode duration and an accelerated hand movement time corresponding to the time required for accelerated hand movement has elapsed, a control signal for suspending the transmission of the accelerated pulse is generated, and this control signal is supplied to the second hand movement unit 30S and the hour-minute hand drive unit 3OHM. As a result, the time display is returned to the current time. In this way, the time information memory unit 96 also has the function of a unit of current time restoring means or unit for restoring the redisplayed time display to the current time.

Next, the drive control circuit 24 generates a drive pulse according to the mode based on the various types of pulses output from the pulse synthesizing circuit 22. First, in the power-saving mode, the supply of the drive pulse is suspended. Next, immediately after the switch has been made from the power-saving mode to the display mode, acceleration pulses with a short pulse interval are supplied as drive pulses to the second hand drive unit 30S and hour-minute hand drive unit 3OHM in order to restore the redisplayed time display to the current time (current time restoring means or unit).

Furthermore, after the supply of the accelerated pulse has been completed, drive pulses of a normal pulse interval are supplied to the second hand drive unit 30S and hour-minute hand drive unit 3OHM.

Reference number 120 denotes a carried state detecting circuit composed of an angular velocity sensor, a thermal sensor or the like, wherein the carried state detecting circuit 120 detects whether or not the electronic timepiece 1 is wound around the user's wrist in order to indirectly detect whether or not the power generating device 40 is in a power generating state. Additionally, the carried state detecting circuit 120 is connected to a non-carrying time measuring circuit 121 provided inside the central control circuit 93. This non-carrying time measuring circuit 121 measures the time of not being carried in a manner roughly similar to that of the power non-generating time measuring circuit 99 described above.

Here, the carried state detecting circuit 120 and non-carrying time measuring circuit 121 are applied to replace the power generation state detecting unit 91 and the power non-generating time measuring circuit 99.

3 Operation of the Embodiment

The operating procedures of the electronic timepiece 1 according to the present invention shall be explained with reference to FIG. 4.

First, the control circuit 23 judges whether or not the electronic timepiece 1 is in power-saving mode (step S1). If in the judgment of step S1, the electronic timepiece 1 is found to be in power-saving mode (step S1; YES), then the procedure jumps to step S5 to be described below.

On the other hand, if the judgment of step S1 finds that the watch is not in power-saving mode, i.e. in the display mode (step S1; NO), then the central control circuit 93 determines whether or not there is a power supply voltage, i.e. whether or not the power generating device 40 is generating power based on the detected signal from the power generation state detecting device 91 (step S2). If it is determined in step S2 that the power generating device 40 is in a power generating state, then a time display procedure is performed according to step S10 to be described below.

If the power generating device 40 is found to be in a non-generating state in step S2 (step S2; NO), then the non-generating time Tn is counted by the non-generating time measuring circuit 99 of the central processing circuit 93 (step S3). Then, the central processing circuit 93 determines whether or not the non-generating time Tn continues past a predetermined set time (step S4).

In the judgment of step S4, if the non-generating time Tn does not continue past the predetermined set time (step S4; NO), then the procedure is returned to step S2, and the procedure from step S2 to step S4 is repeated.

If in the judgment of step S4, the non-generating time Tn is found to continue past the predetermined set time (step S4; YES), then the mode is switched to the power-saving mode (step S5).

In the power-saving mode, time information corresponding to the elapsed time of the power-saving mode is counted in the time information memory unit 96 (step S6) in order to perform a time restoration process (step S9) to be described below.

Then, it is determined whether or not the power supply voltage (charge voltage Vc of the high-capacity capacitor 48 in the present embodiment) is larger than the criterion voltage V1 which is required to switch from the power-saving mode to the display mode (step S7) (second condition). If the charge voltage Vc is found to be greater than the criterion voltage V1 in step S7 (step S7; YES), i.e. it is possible to switch from the power-saving mode back to the display mode, then it is determined whether or not the power generating device 40 is generating power once again (step S8). If it is determined in step S8 that there is no power generation (step S8; NO), then steps S6 and S7 are repeated.

Additionally, when it is found in step S8 that power generation has begun (step S8; YES), then the mode is switched from the power-saving mode to the display mode, a time restoration process for restoring the time to the count value of the time information memory unit 96 is performed, and the hands 55, 76, 77 are driven as normal (step S10). The time restoration process from the power-saving mode to the display mode is a current time restoration process which is performed faster than the normal drive operation.

On the other hand, if in step S7, it is found that the charge voltage Vc accumulated in the high-capacity capacitor 48 is less then or equal to the criterion voltage V1 (step S7; NO), i.e. the charge voltage Vc of the high-capacity capacitor 48 has fallen to a voltage which is not capable of restoring the display mode from the power-saving mode, then the supply of the charge voltage Vc supplied from the high-capacity capacitor 48 to the voltage raising/lowering circuit 49 is cut off, and the supply of the power supply voltage Vss output from the voltage raising/lowering circuit 49 to the Vss drive unit 23A of the control circuit 23, pulse synthesizing circuit 22 and drive units 30S, 3OHM is cut off (step S11).

In step S11, the generation of the pulse signal by the pulse synthesizing circuit 22 is stopped and the count by the time information memory unit 96 is suspended by cutting off the supply of the power supply voltage Vss to the Vss drive unit 23A of the control circuit 23, pulse synthesizing circuit 49 and drive units 30S, 3OHM. As a result, the consumption of electrical energy in the control circuit 23 is made zero. For example, the electrical energy consumption rate when in the power-saving mode can be cut to approximately 80% with respect to the power consumption when in the display mode, but in this state, it can be cut further to 99.5%. Additionally, in the Vss drive unit 23A, the supply of the power supply voltage Vss is not cut off to only the power generation state detecting unit 91, and by continuing to supply the power supply voltage Vss, it is possible to stabilize the circuit operations at reactivation.

Furthermore, in step S12, the power generation state detecting unit 91 monitors whether or not the power generating device 40 has resumed power generation (third condition), and the procedure is held at step S12 until the power generation state detecting unit 91 detects that power generation has begun.

Here, when the power generation state detecting unit 91 detects that power generation has resumed (step S12; YES), the charge voltage Vc from the high-capacity capacitor 48 is supplied to the voltage raising/lowering circuit 49, the power supply voltage Vss is supplied from the voltage raising/lowering circuit 49 to the Vss drive unit 23A, pulse synthesizing circuit 22 and the drive units 30A, 3OHM to reactivate the electronic timepiece 1.

In this step S12, the charge voltage Vc of the high-capacity capacitor 48 is detected from the voltage detecting circuit 92 to determine whether or not the minimum required voltage for reactivation is present, and the supply of the charge voltage Vc is suspended until this voltage value is reached, thereby enabling the high-capacity capacitor 48 to be charged quicker.

Additionally, in this case, a time restoration process cannot be performed because the control circuit 23 is also suspended, thus requiring the user to set the time manually.

Furthermore, explaining with more specific numerical values, since the high-capacity capacitor 48 is put into a fully charged state after power generation is started when the charge voltage Vc of the high-capacity capacitor 48 is reduced to approximately 0.45 V under the conventional art, the electronic timepiece 1 must be shaken about 300 times. However, in the present embodiment, the criterion voltage V1 is set to 1 V, thus making it difficult for the charge voltage Vc to fall below 1 V, so that in order to put the high-capacity capacitor 48 into a fully charged state since beginning power generation, it is sufficient to shake the electronic timepiece 1 about 100 times, thus enabling the electronic timepiece to be readily reactivated.

4 Effects of the Embodiment

As explained above, the electronic timepiece 1 of the present embodiment is such that when the electronic timepiece 1 is in the power-saving mode, i.e. the charge voltage Vc is output from the high-capacity capacitor 48 to the voltage raising/lowering circuit 49, and the power supply voltage Vss raised or lowered from the charge voltage Vc by the voltage raising/lowering circuit 49 is supplied to only the control circuit 23, if the charge voltage Vc from the high-capacity capacitor 48 goes to less than or equal to the criterion voltage V1 which is required to return from the power-saving mode to the display mode, then the supply of the charge voltage Vc which is output from the high-capacity capacitor 48 to the voltage raising/lowering circuit 47 is suspended, and the supply of the power supply voltage Vss from the power supply unit B (voltage raising/lowering circuit 47) to the drive unit 23A of the control circuit 23, the pulse synthesizing circuit 22 and the drive units 30S, 3OHM is suspended.

Thus, the needless consumption of electrical energy in the high-capacity capacitor 48 can be eliminated, and the charge voltage Vc maintained in the high-capacity capacitor 48. As a result, when the power generating device 40 begins to generate power, the charge voltage Vc of the high-capacity capacitor 48 can be output to the voltage raising/lowering circuit 49, whereby the power supply voltage Vss is supplied from the voltage raising/lowering circuit 49 to the Vss drive potion 23A of the control circuit 23, the pulse synthesizing circuit 22 and the drive units 30S, 3OHM, to quickly reactivate the electronic timepiece 1.

Additionally, by suppressing unnecessary consumption of charge voltage Vc from the high-capacity capacitor 48, the hands 55 can be quickly activated when the power generating device 40 begins to generate power when a user carries the electronic timepiece 1, thus preventing users from jumping to the conclusion that the electronic timepiece 1 is broken.

5 Modification Examples of Embodiment 5.1 First Modification Example

Figure 5:
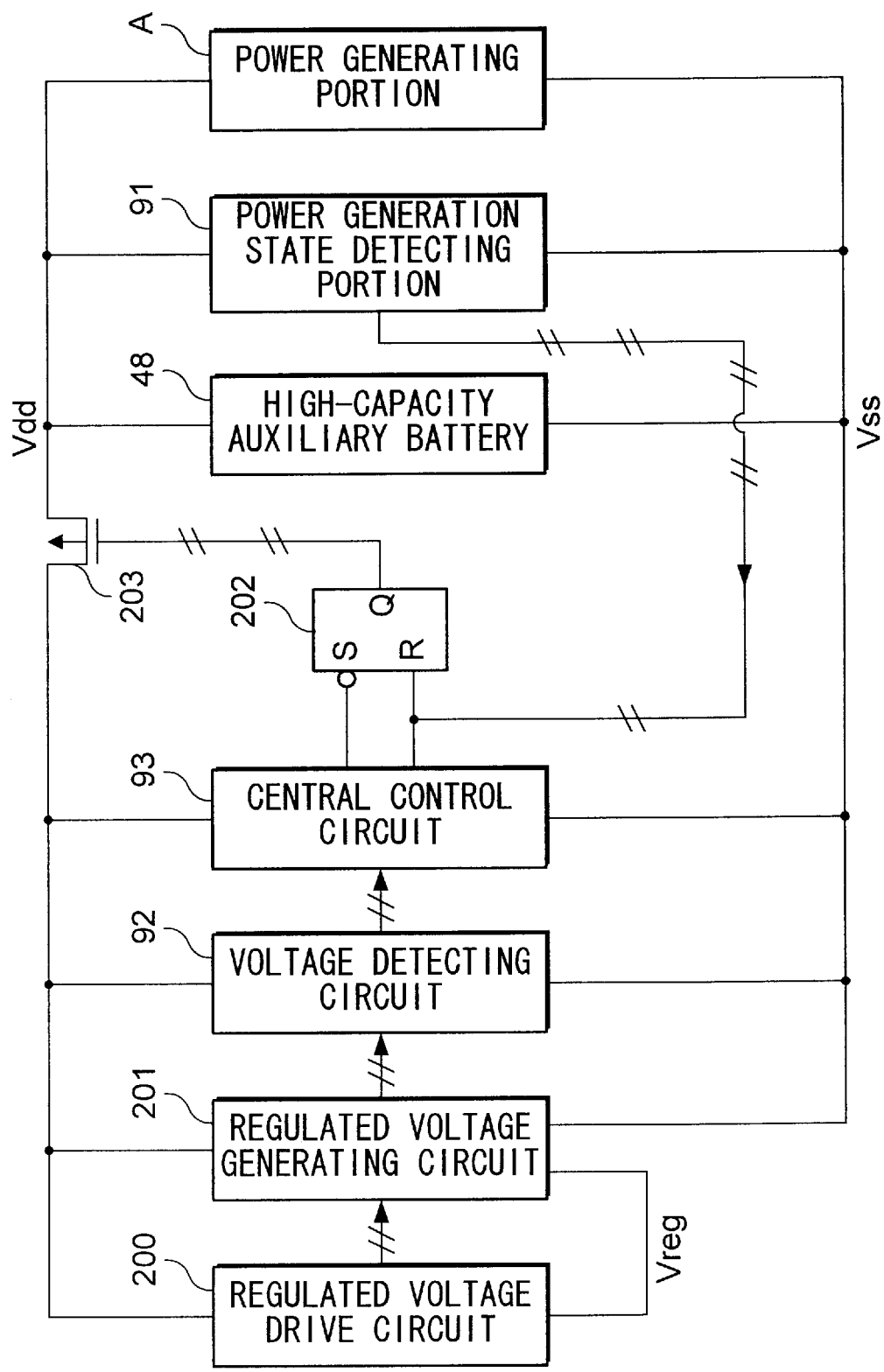
FIG. 5 is a block diagram showing the structure of a power supply unit and peripheral circuits according to a first modification example.

In the present first modification example, as shown in FIG. 5, the voltage supplied to the regulated voltage drive circuit 200 (e.g. oscillator circuit, dividing circuit, etc.) is made a regulated voltage Vreg set by the regulated voltage generating circuit 201.

Here, the regulated voltage generating circuit 201 shall be described.

Figure 12:
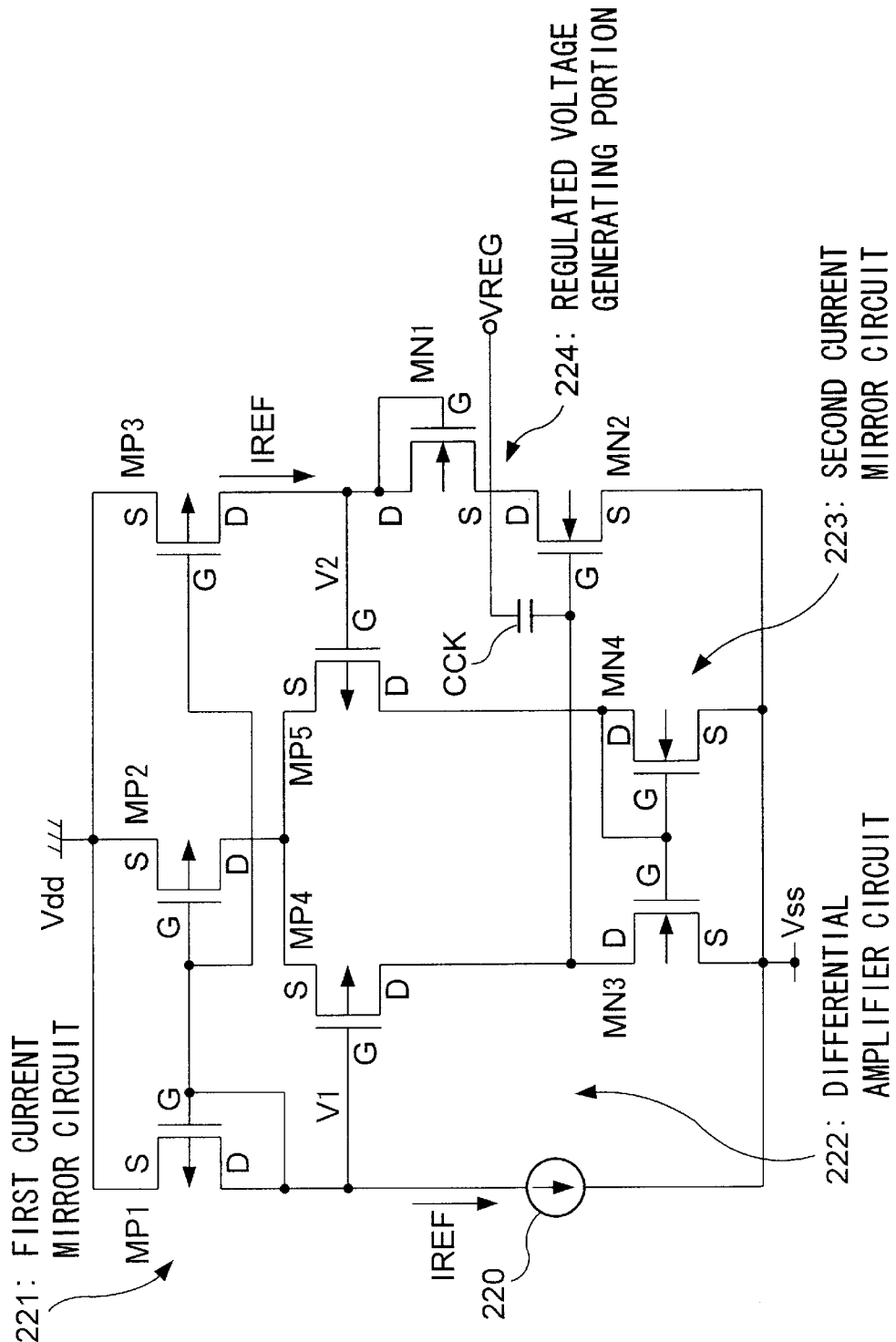
FIG. 12 is a schematic structural diagram of a regulated voltage generating circuit.

A structural diagram of the regulated voltage generating circuit 201 is shown in FIG. 12.

The constant current generating circuit 201 can be largely divided into a constant current source 220, a first current mirror circuit 221, a differential amplifier circuit 222, a second current mirror circuit 223 and a regulated voltage generating unit 224. The constant current source 220 is a depression transistor or the like which generates a constant current IREF. The first current mirror circuit 221 generates a current which is identical to the constant current IREF. The differential amplifier circuit 222 performs differential amplification of the reference voltage V1 and generated voltage V2 generated when the constant current IREF flows. The second current mirror circuit 223 makes the currents flowing in the various units of the differential amplifier circuit 222 into constant currents. The regulated voltage generating unit 224 generates and outputs a regulated voltage based on the output of the differential amplifier circuit 222.

The first current mirror circuit 221 has P-channel MOS transistors MP1, MP2 and MP3 having their source S commonly connected to a high potential side power supply VDD and the gate terminal G connected together, with the gate G and drain D of the P-channel MOS transistor MP1 being saturation-connected.

The differential amplifier circuit 222 comprises a P-channel MOS transistor MP4, a P-channel MOS transistor MP5 and a gate potential maintaining capacitor CCK. The P-channel MOS transistor MP4 has its source S connected to the drain D of the P-channel MOS transistor MP2 and its gate G connected to the drain D of the P-channel MOS transistor MP1. The P-channel MOS transistor MP5 has its source S connected to the drain D of the P-channel MOS transistor MP2 and its gate G connected to the drain D of the P-channel MOS transistor MP3. The gate potential maintaining capacitor CCK has one end connected to the drain of the P-channel MOS transistor.

The second current mirror circuit 223 comprises an N-channel MOS transistor MN3 and an N-channel MOS transistor MN4. The N-channel MOS transistor MN3 has its drain D connected to the drain D of the P-channel MOS transistor MP4 and its source S connected to the low potential side power supply VSS side. The N-channel MOS transistor MN4 has its gate G connected to the gate G of the N-channel MOS transistor MN3, its drain D connected to the drain of the P-channel MOS transistor MP5 and the gate G of the N-channel MOS transistor MN3, and its source S connected to the low potential side power supply VSS side.

The regulated voltage generating unit 224 comprises an N-channel MOS transistor MN1 and an N-channel MOS transistor MN2. The N-channel MOS transistor MN1 has its gate G saturation-connected to its drain D,-its drain D connected to the drain D of the P-channel MOS transistor MP3 and its source S connected to the other end of the gate potential maintaining capacitor CCK. The N-channel MOS transistor MN2 has its drain D connected to the source S of the N-channel MOS transistor MN1, its source S connected to the low potential side power supply VSS, and its gate G connected to one end of the gate potential maintaining capacitor CCK. Additionally, the connection point between the source S of the N-channel MOS transistor MN1 and the drain of the N-channel MOS transistor MN2 is the output terminal of the regulated voltage VREG.

Next, the operations of the regulated voltage generating circuit 201 shall be described.

The first current mirror circuit 221 generates a current (in the drawing, indicated by the same reference IREF) identical to the constant current IREF generated by the constant current supply 220 as the source-drain current of the P-channel MOS transistor MP3, which is supplied to the regulated voltage generating unit 224.

At this time, the relationship between the drain current Ids of the P-channel MOS transistor MP1 and the gate voltage can be expressed as follows:

$$Ids = \beta \cdot W/(2 \cdot L) \cdot (Vgs - Vth)2$$

Here, β represents the gain constant.

Parallel thereto, the differential amplifier circuit 222 performs a differential amplification of the reference voltage V1 and voltage V2, and outputs to the regulated voltage generating unit 224.

At this time, the source-drain current of the P-channel MOS transistor MP4 and P-channel MOS transistor MP5 have current values which are identical due to the second current mirror circuit.

The regulated voltage generating unit 224 performs feedback control of the output of the differential amplifier circuit 222 such that the reference voltage V1 and the reference voltage V2 are:

$$V1 = V2$$

As a result, a regulated voltage Vreg which is determined by the threshold voltage VTP of the P-channel MOS transistor MP1 forming the first current mirror circuit 221, the threshold value VTN of the N-channel MOS transistor MN1 of the regulated voltage generating unit 224 and the constant current IREF is generated.

When the voltage supplied to the regulated voltage drive circuit 200 (e.g. the oscillator circuit, dividing circuit etc.) is made the regulated voltage Vreg set by the regulated voltage generating circuit 201, an operation suspending means or unit separate from the central control circuit 93 is formed by a latch circuit 202 and the P-channel transistor 203 connected between the output side of the latch circuit 202 and the middle of the high potential side Vdd line is formed between the high-capacity capacitor central control circuit 93. When the high potential side voltage Vdd is taken as the reference voltage (GND), the low potential voltage Vss becomes the power supply voltage and the potential difference becomes equal to the charge voltage Vc.

Additionally, the oscillator circuit and divider circuit are driven by the regulated voltage Vreg output from the regulated voltage generating circuit 201.

Here, during the power-saving mode, the central control circuit 93 monitors the power supply voltage (charge voltage Vc of the high-capacity capacitor 47) by means of the voltage detecting circuit 92, and outputs an "L" to the latch circuit 202 when the voltage drops below a predetermined value. Then, at the latch circuit 202, the signal output from the power generation state detecting unit 91 and the signal output from the central control circuit 93 are received, a signal putting the transistor 203 to "H" is output, and the transistor 203 is put into an off state. Then, the supply of the charge voltage Vc of the high-capacity capacitor 48 to the central control circuit 93, the voltage detecting circuit 92, the regulated voltage generating circuit 201 and the like is cut off. As a result, the regulated voltage Vreg which is output from the regulated voltage generating circuit 201 upon receiving the charge voltage Vc is suspended and the operation of the regulated voltage drive circuit 200 is suspended.

Furthermore, in the power-saving mode, the drive units 30S, 3OHM are suspended, and most of the power consumption on the circuit is consumed by the regulated voltage drive circuit 200 such as the oscillator circuit for generating the reference pulse signal and the divider circuit, and the regulated voltage generating circuit 201, so that by suspending the supply of the regulated voltage Vreg to the regulated voltage drive circuit 200, the power consumption on the regulated voltage drive circuit 200 can be reduced to zero. Furthermore, the power consumption of the entire circuit can be made close to zero by suspending the supply of the power supply voltage Vss to the regulated voltage generating circuit 201.

Additionally, when the power generation state detecting unit 91 detects that power generation has begun at the power generating unit A and inputs a signal "H" to the latch circuit 202, the transistor 203 goes to an off state, and the charge voltage Vc is supplied to central control circuit 93, the voltage detecting circuit 92, and the regulated voltage generating circuit 201. Since a sufficient voltage is held in the high-capacity capacitor 48 when oscillation begins, the initiation of the oscillation can be quickened. Consequently, the electronic timepiece 1 can be readily reactivated.

When the transistor 203 is put into an off state and the supply of the power supply voltage Vss is suspended, the output of the latch circuit 202 becomes unstable. Therefore, a pull-up resistor having a high resistance value should preferably be connected to the gate terminal side of the transistor 203 in order to ensure that the transistor 203 is in an off state.

5.2 Second Modification Example

Figure 6:
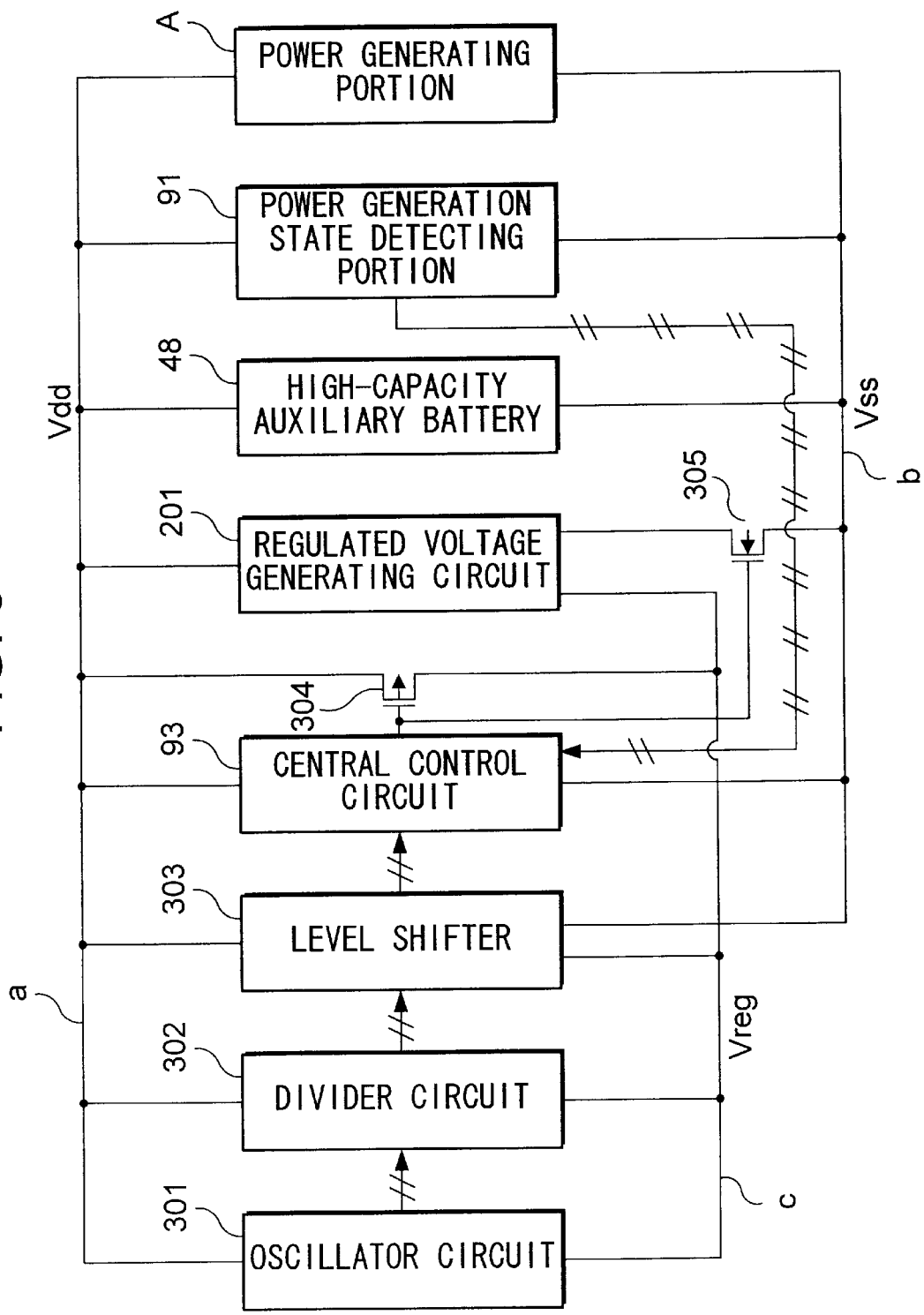
FIG. 6 is a block diagram showing the structure of a power supply unit and peripheral circuits according to a second modification example.

In the first modification example, the transistor 203 is connected on the line through which the high potential side voltage Vdd is supplied so as to cut off the supplied current. Therefore, in the first modification example, a transistor 203 with a comparatively large capacity must be used. Thus, in the second modification example, the same can be achieved by forming an operation suspending means or unit as shown in FIG. 6.

The oscillator circuit 301, divider circuit 302 and level shifter 303 are detailed specifics of the regulated voltage drive circuit 200 driven by the regulated voltage Vreg. Additionally, in this modification example, the line having the high potential side voltage Vdd is made the reference line a, the line having the low potential side voltage Vss is made the power supply line b and the line having the regulated voltage Vreg which is a constant potential is made the regulated voltage line c.

Here, a P-channel type transistor 304 is connected between lines a and c, a P-channel type transistor 305 is connected between the line b and the regulated voltage circuit 92, and the gate of the transistor 305 is connected to the output side of the central control circuit 92. Additionally, the gate of the transistor 304 is connected to the output side of the central control circuit 92. The transistor 304 and transistor 305 form the operation suspension means or unit.

With the circuit arrangement of the second modification example formed in this way, the power generation state detecting unit 91 monitors the power generation state of the power generating unit A when the electronic timepiece 1 is in the power-saving mode, and when the power generating unit goes into a non-power generating state, outputs an "L" signal to the transistor 304 and transistor 305. As a result, the transistor 304 goes into an on state and short-circuits the reference line a and the regulated voltage line c, thereby cutting off the regulated voltage Vreg supplied to the oscillator circuit 301, the divider circuit 302 and the level shifter 303. At roughly the same time, an "L" signal is input to the transistor 305, putting the transistor 305 into an off state, cutting off the charge voltage Vc supplied from the high-capacity capacitor 48 to the regulated voltage generating circuit 92, and also cutting off the supply of the regulated voltage Vreg.

On the other hand, when power generation is started, an "H" signal is output from the central control circuit 93, thus turning the transistor 304 off, turning the transistor 305 on, and activating the regulated voltage generating circuit 92 to supply the regulated voltage Vreg. As a result, a regulated voltage Vreg is supplied also to the oscillator circuit 301, and a reference pulse is generated from the oscillator circuit 301.

Moreover, with this circuit arrangement, a transistor with relatively low voltage resistance can be used as the transistor, and the power consumption on the regulated voltage generating circuit 92 can be made roughly zero by cutting off the supply of the charge voltage Vc.

While the transistor 304 was turned on to cut off the supply of the regulated voltage Vreg, it is also possible to connect a transistor on the regulated voltage line c and turn this transistor off to cut off the supply of the charge voltage. Additionally, the latch circuit 202 shown in the first modification example can be internalized in the central control circuit 92.

Additionally, in the above description, the on/off operation of the transistor 304 and the on/off operation of the transistor 305 were performed simultaneously, but it is more preferable to provide a delay circuit before the gate of the transistor 304 and operate the transistor 305 first.

5.3 Third Modification Example

Figure 7:
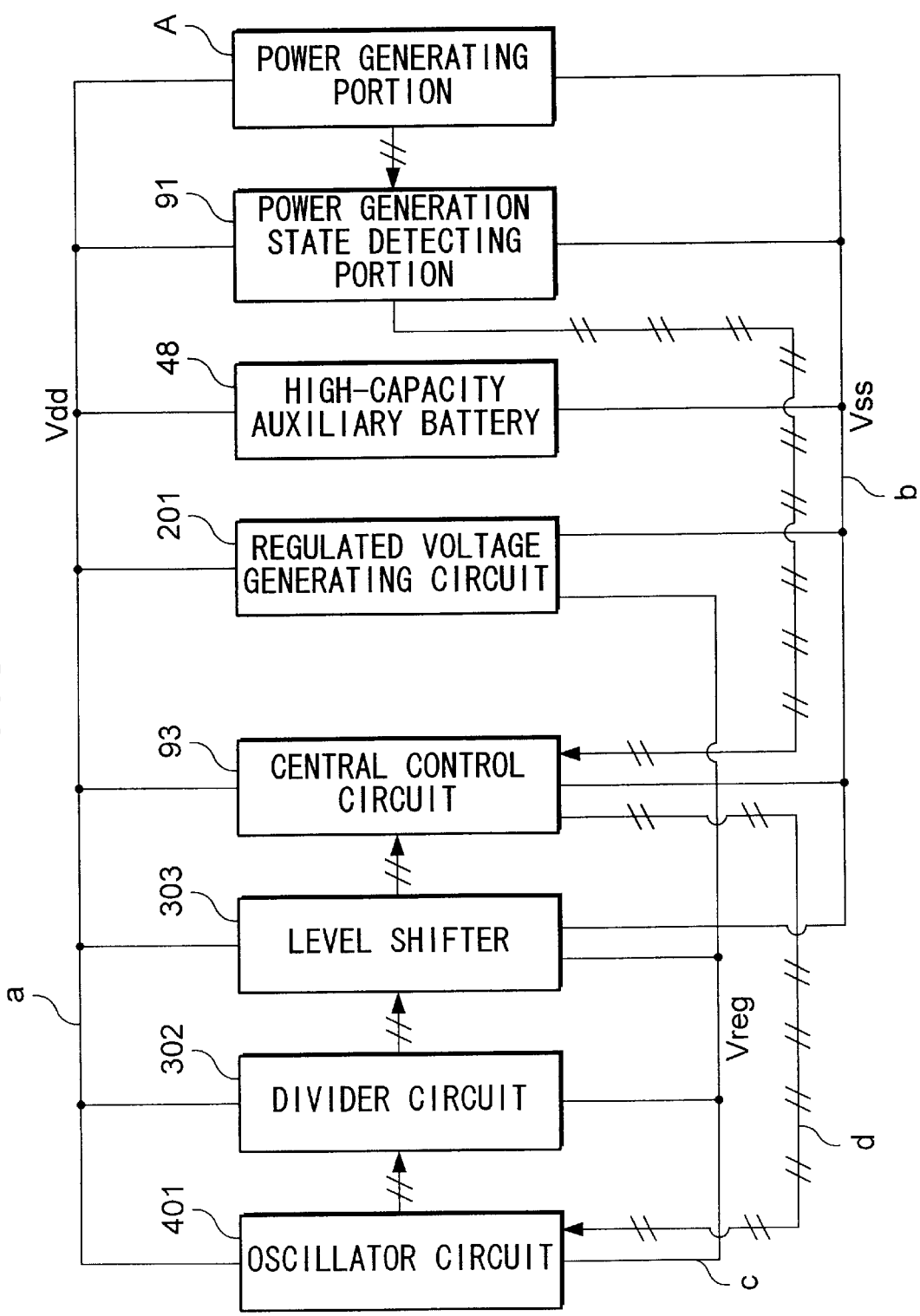
FIG. 7 is a block diagram showing the structure of a power supply unit and peripheral circuits according to a third modification example.

Next, a third modification example shall be described with reference to FIGS. 7 and 8. This modification example is one where the reference pulse generated from the oscillator circuit is cut off.

First, while the circuit configuration around the power supply is roughly the same as in the second modification example, the operation suspending means or unit composed of the transistor 304 and the transistor 305 is not connected, and the central control circuit 93 and oscillator circuit 401 are connected by a signal line d over which the oscillator circuit drive signal is output.

Figure 8:
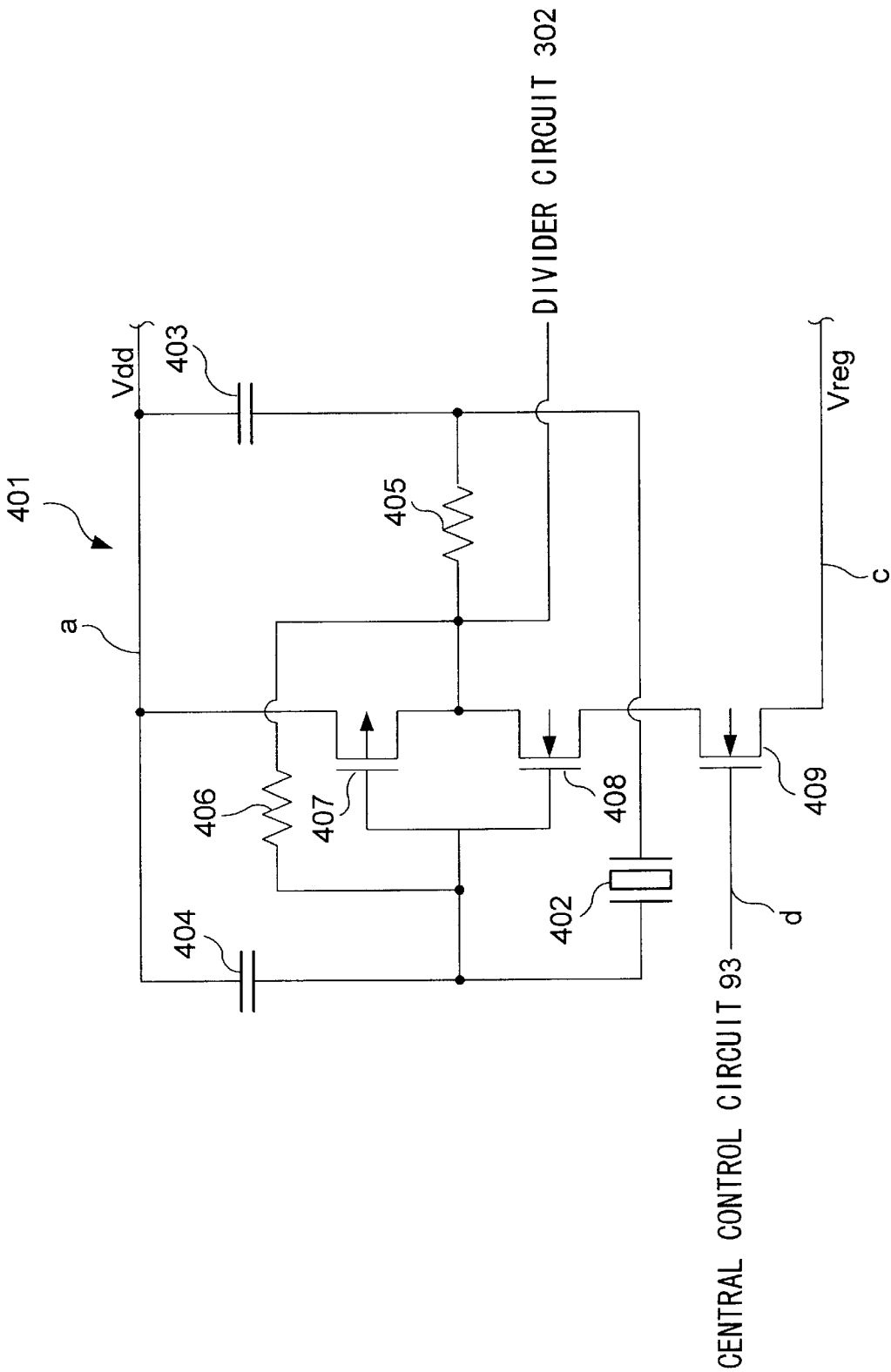
FIG. 8 is a circuit diagram showing the specifics of an oscillation circuit.

Next, the circuit structure of the oscillator circuit 401 internalized into the electronic timepiece 1 in FIG. 8 shall be described.

Both ends of the quartz oscillator 402 are connected through a drain capacitor 403 and a gate capacitor 404 to a reference line a which has the high potential side voltage Vdd, and is further connected to the series circuit composed of the drain resistor 405 and the feedback resistor 406. Additionally, between the reference line a and the regulated voltage line c, beginning from the reference line a side, a P-channel transistor 407, an N-channel transistor 408 and a P-channel transistor 409 are connected in that order. Furthermore, the gates of the transistors 407, 408 are connected to the connection point between the gate capacitor 404 and the feedback resistor 406, the drain of the transistor 407 and the drain of the transistor 408 are connected to the drain resistor 405, and the gate of the transistor 409 is connected to the output side of the central control circuit 93. On the other hand, the connection point between the drain resistor 405 and the feedback resistor 406 is connected to the divider circuit 302.

In this oscillator circuit 401, the parts other than the quartz oscillator 402 are integrated, forming an oscillation inverter by means of the circuit elements aside from the quartz oscillator 402, the transistor 409 and the feedback resistor 406.

With the circuit configuration according to the third modification example structured in this way, when the electronic timepiece 1 is in the display mode or the power-saving mode, the oscillator circuit drive signal which is output from the central control circuit 93 through the signal line d to the gate of the transistor 409 goes to "H", a regulated voltage Vreg is supplied to the oscillation inverter and a specific vibration due to the quartz oscillator 402 is used to output a reference pulse to the divider circuit 302.

Additionally, when the electronic timepiece is in the power-saving mode, the power generation state detecting unit 91 monitors the power generation state of the power generating unit A, and when the power generating unit A goes into a non-power generating state, an oscillator circuit drive signal which is at "L" is output toward the gate of the transistor 409 to turn the transistor 409 off. Then, the supply of the regulated voltage Vreg to the oscillator inverter is suspended and the reference pulse generated from the oscillator circuit 401 is stopped. As a result, the power consumption of each circuit can be reduced.

On the other hand, when the power generation state detecting unit 91 detects that the power generating unit A has begun generating power, an oscillator circuit drive signal which is at "H" is output from the central control circuit 93 through the signal line d to the gate of the transistor 409, the regulated voltage Vreg is supplied to the oscillator inverter and the reference pulse is output from the oscillator circuit 401 toward the divider circuit 302.

5.4 Fourth Modification Example

Figure 9:
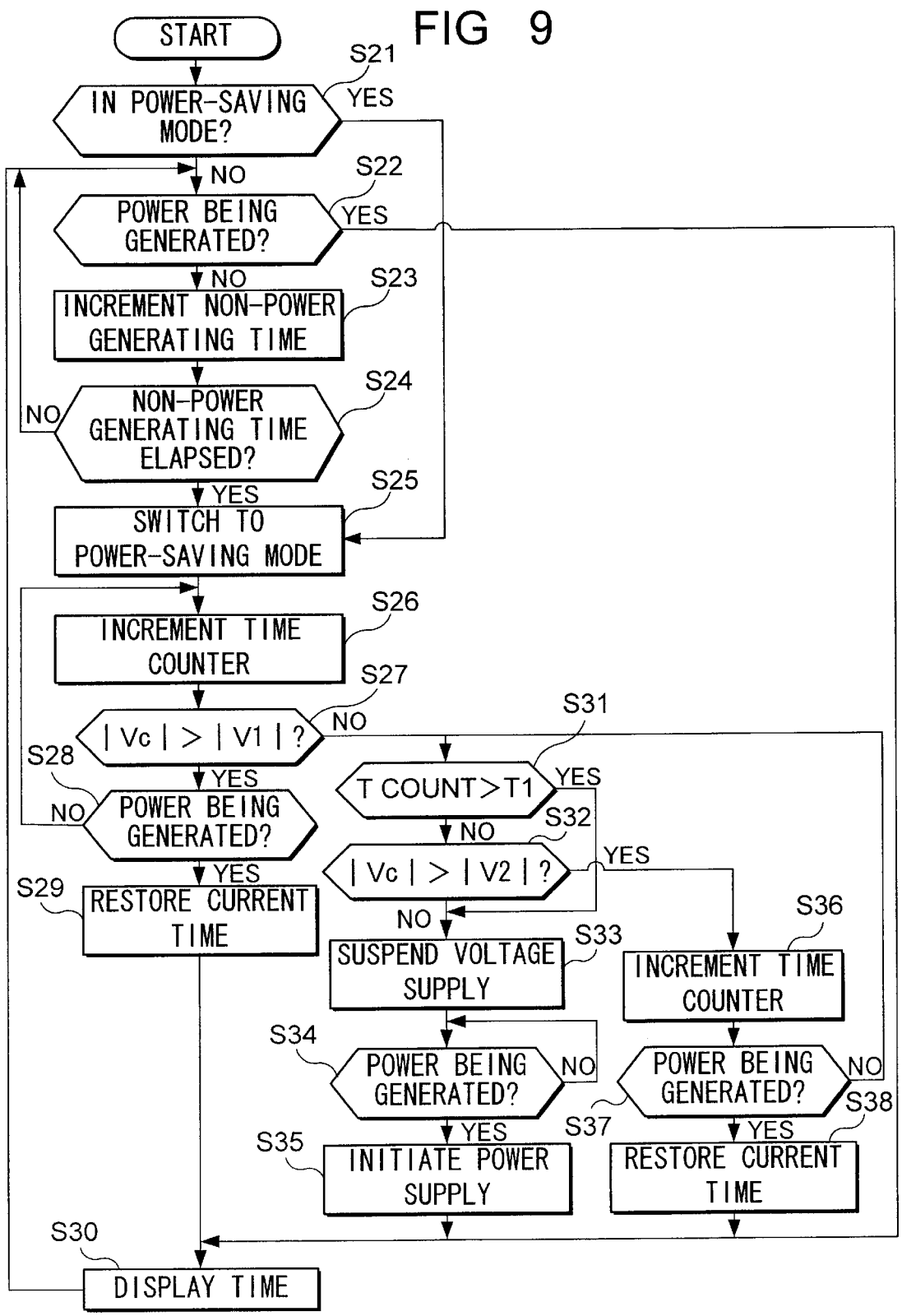
FIG. 9 is a flow chart showing the operations of a fourth modification example.

In this fourth modification example, as indicated in the flow chart of FIG. 9, the criterion voltage for shifting from a power-saving mode to cutting off the supply of voltage is determined by a second criterion voltage V2 (hereinafter referred to as the second criterion voltage V2) which is lower than the criterion voltage V1 (hereinafter referred to as the first criterion voltage V1), and a criterion count value T1, the second criterion voltage V2 being the voltage value necessary for the hands 55, 76, 77 to rotate roughly 180 degrees in returning from the power-saving mode to the display mode, and the criterion counter value T1 being the counter value at this time.

Figure 4:
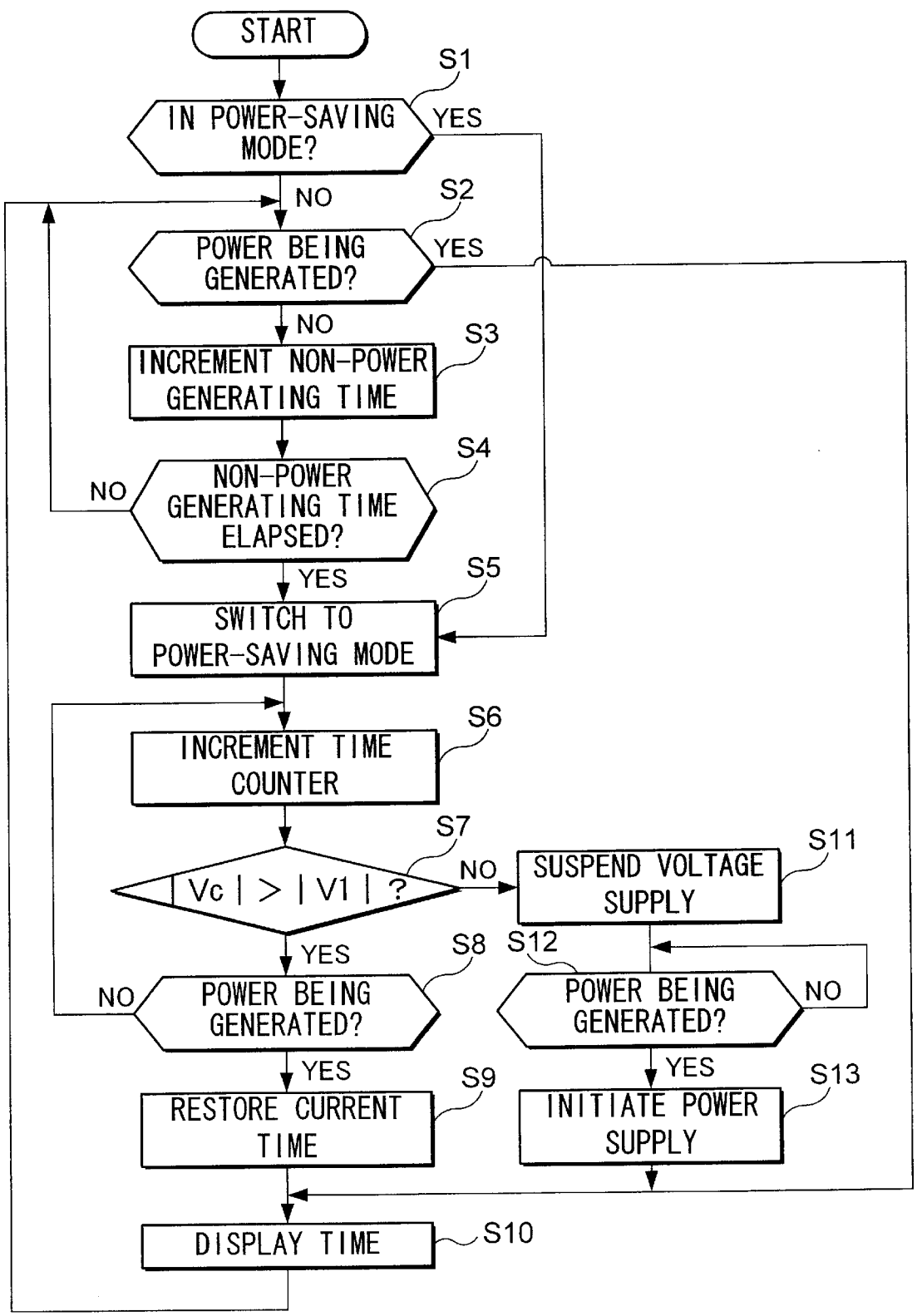
FIG. 4 is an operational flow chart of an embodiment.

Here, the procedure from step S21 to step S30 is roughly the same as the procedure from step S1 to step S10 in FIG. 4, and its description shall be omitted.

In the determination of step S27, if the charge voltage Vc of the high-capacity capacitor 48 is less than or equal to the first criterion voltage V1 (step S27; NO), i.e. the voltage of the high-capacity capacitor 48 is a voltage such that it is not possible to return from the power-saving mode to the display mode, then it is determined whether or not the value of the time counter T has exceeded the criterion counter value T1 (step S31).

In this step S31, if the value of the counter T has exceeded the criterion counter value T1, then the procedure shifts to step S33, and the procedures following step S33 are performed, whereas if it has not exceeded the value, then the procedure of step S32 is performed. That is, in step S32, it is determined whether or not the charge voltage Vc is larger than the second criterion voltage V2, and if the charge voltage Vc is smaller than the second criterion voltage V2 (step S32; NO), i.e. if there is not enough electrical energy left in the high-capacity capacitor 48 to restore the hands 55, 76, 77, then in step S33, the supply of voltage to the control circuit 23 and the drive units 30S, 30HM is cut off.

Furthermore, in step S34, the power generation state detecting unit 91 monitors whether or not the power generating device 40 has started to generate power, and the process stands by in step S34 until the power generation state detecting unit 91 detects that power generation has begun. On the other hand, if the power generation state detecting unit 91 detects that power generation has begun (step S34; YES), the charge voltage Vc supplied from the high-capacity capacitor 48 is supplied to the control circuit 23 and the drive units 30S, 3OHM to activate the electronic timepiece 1 (step S35).

On the other hand, if the charge voltage Vc is greater than the second criterion voltage V2 in the determination of step S32 (step S32; YES), i.e. if there is enough energy left in the high-capacity capacitor 48 to restore the hands 55, 76, 77, then the counting of time is continued in step S36, the power generation state detecting unit 91 monitors whether or not power generation has begun in step S37, and if power generation is not detected, then the procedure is repeated from step S31.

Additionally, if there is power generation in the determination of step S37, then the procedure shifts to step S38 to perform a current time restoration process.

Thus, in this modification example, the voltage supply is cut off if after the charge voltage Vc has become smaller than the first criterion voltage V1, the value T of the time counter becomes larger than the criterion counter value T1 or the charge voltage Vc become smaller than the second criterion voltage V2. As a result, a time delay can be added before cutting off the supply of the charge voltage Vc, thus considerably suppressing cases where the supply of the charge voltage Vc is cut off, and enabling restoration from the power-saving mode to the display mode for displaying the current time when power generation begins.

5.6 Sixth Modification Example

In the above embodiments, an example of an electronic timepiece which displays the hour/minute and second using two motors was described, but the present invention can likewise be applied to electronic timepieces which display the time using a single motor for the hour/minute and second.

On the other hand, the present invention can also be applied to an electronic timepiece having 3 or more motors (motors for separately controlling the second hand, minute hand, hour hand, calendar, chronograph, etc.).

5.7 Seventh Modification Example

In the above embodiments, the watch automatically switches between the display mode and power-saving mode, but it may be such as to detect an operation by the user on an external input device 100 such as a specific operation on a crown, and to then switch forcibly from the display to the power-saving mode or switch from the power-saving mode to voltage supply suspension. Furthermore, the cutoff and initiation of the supply of electrical energy from the power supply unit B can be made to be performed according to operating conditions of the external input device 100.

5.8 Eighth Modification Example

In the above-described embodiments, the power generation state detecting unit 91 monitors whether the power generating device 40 is in a power generating state or a non-power generating state, but the invention is not so limited, and the monitoring can be performed indirectly by means of the carried state detecting circuit 120 shown in FIG. 2 such as to find that the power generating device 40 is in a non-power generating state when in an uncarried state.

5.9 Ninth Modification Example

In the above-described embodiments, the charge voltage Vc of the high-capacity capacitor 48 is monitored by the voltage detecting circuit 92, and the supply of electrical energy is cut off if the charge voltage Vc goes to the criterion voltage V1 or below, but the present invention is not so limited, and may be such as to supply and cut off the electrical energy by monitoring the power supply voltage Vss output from the voltage raising/lowering circuit 49.

5.10 Tenth Modification Example

In the above-described embodiments, an example of a wristwatch-type electronic timepiece 1 was used, but the present invention is not so restricted, and may be applied to other types of portable electronic devices aside from wristwatches, such as calculators, portable telephones, portable computers, PDA's, liquid crystal televisions and portable video decks.

5.11 Eleventh Modification Example

In the above-described embodiments, an electromagnetic power generating device which generates power Vgen in an output coil 44 by the rotation of a rotor 43 which is transmitted to the rotor 43 by rotational motion of a rotating weight 45 is employed as the power generating device 40, but the present invention is not so limited, and, for example may use a power generating device which generates power by rotational motion generated by the return force of a spring (corresponding to external energy), or a power generating device which generates power by means of a piezoelectric effect by applying external or auto-induced vibration or displacement (corresponding to external energy) of a piezoelectric element.

Additionally, the power generating device may be such as to generate power by photoelectric conversion using light energy (corresponding to external energy) from sunlight or the like.

Furthermore, the power generating device may generate power by means of thermal power generation due to a temperature difference (thermal energy; corresponding to external energy) between a certain unit and another unit.

Additionally, the structure may be such as to use an electromagnetic induction type power generating device which receives freely propagating electromagnetic waves such as those for broadcast or communication, and uses these for energy (corresponding to external energy).

5.12 Twelfth Modification Example

In the above-described embodiments, the reference potential (GND) was set to Vdd (high potential side voltage), but the reference potential (GND) may of course be set to Vss (low potential side voltage). In this case, the set voltage values V0 and Vgen, etc. represent potential differences from a detected level set on the high potential side with Vss as a reference.

5.13 Thirteenth Modification Example

In the above-described embodiments, chargeable electrical storage devices such as auxiliary batteries and capacitors were used to store power generated by the power generating device as the power supply, but it is possible to use primary batteries, or else to use both a chargeable electrical storage device and a primary battery together, or to use a power generating device and a primary battery together.

5.14 Fourteenth Modification Example

In the above-described embodiments, the case of an analog electronic timepiece was described, but the invention is also applicable to electronic devices having digital display devices (digital display means) such as liquid crystal panels.

In this case, the supply of power to the digital display device is cut off when in the power-saving mode, so that there is no display.

When the display is not on, a unit of a display can be left so as to prevent the user from making the mistaken assumption that the watch has broken. For example, a mark which blinks every 2–3 seconds can be displayed on the display screen.

What is claimed is:

1. An electronic device comprising:

a chargeable power supply unit for supplying electrical energy;

a driven unit;

a mode switching unit for switching, based on a preset condition, an operating mode of said electronic device between a drive mode in which said driven unit is driven and a power-saving mode in which said driven unit is not driven;

a control circuit operated by the electrical energy supplied from said power supply unit, for generating control signals to control elements in said electronic device;

a drive unit operated by the electrical energy supplied from said power supply unit, for generating a drive signal in response to a part of said control signals under a condition in which said electronic device is in the drive mode; and an operation suspending unit, responsive to the mode switching unit switching the operating mode of the electronic device to a power-saving mode, for suspending operation of said control circuit when the amount of electrical energy stored in said power supply unit becomes smaller than a predetermined electrical energy amount.

2. An electronic device in accordance with claim 1, wherein said operation suspending unit suspends supply of the electrical energy from said power supply unit to said control circuit when suspending the operation of said control circuit.

3. An electronic device in accordance with claim 1, wherein said power supply unit comprises a power generating unit for converting external energy into electrical energy, and a power storing unit for storing electrical energy supplied from said power generating unit and supplying the electrical energy to said control circuit.

4. An electronic device in accordance with claim 3, wherein said power storing unit comprises one of an auxiliary battery and a capacitor.

5. An electronic device in accordance with claim 3, further comprising:

a power generation state detecting unit for detecting whether or not said power generating unit is in a power generation state, and wherein said mode switching unit switches the operating mode based on whether or not said power generating unit is in a power generating state as determined by said power generation state detecting unit.

6. An electronic device in accordance with claim 5, wherein said power generation state detecting unit comprises an energy amount determining unit for determining whether or not the amount of electrical energy output from said power generating unit exceeds a criterion energy amount; and a power generation time determining unit for determining whether or not a duration, over which the electrical energy amount as determined by said energy amount determining unit exceeds the criterion energy amount, exceeds a criterion time value.

7. An electronic device in accordance with claim 1, further comprising:

a carried state detecting unit for detecting whether or not said electronic device is in a carried state, and wherein said mode switching unit switches the operating mode from said drive mode to said power-saving mode when the duration over which said electronic device is found to be in a non-carried state by said carried state detecting unit continues for a predetermined time, and switches the operating mode from said power-saving mode to said drive mode when said carried state detecting unit detects switching from the non-carried state to a carried state.

8. An electronic device in accordance with claim 1, further comprising:

a voltage detecting unit for detecting the voltage of said power supply unit, and wherein said operation suspending unit determines whether the amount of electrical energy stored in said power supply unit becomes smaller than said predetermined electrical energy amount, based on the voltage detected by said voltage detecting unit.

9. An electronic device in accordance with claim 1, further comprising:

an electrical energy amount detecting unit for detecting the amount of electrical energy supplied from said power supply unit, and wherein said predetermined electrical energy amount is an amount of electrical energy required to restore the operating mode from said power-saving mode to said drive mode, and said operation suspending unit determines whether the amount of electrical energy stored in said power supply unit becomes smaller than said predetermined electrical energy amount based on the amount of electrical energy detected by said electrical energy amount detecting unit.

10. An electronic device in accordance with claim 3, further comprising:

a power generation state detecting unit for detecting whether or not said power generating unit is in a power generating state; and an operation initiating unit for initiating the operation of said control circuit when initiation of power generation by said power generating unit is detected by said power generation state detecting unit under a condition in which the operation of said control circuit is in a suspended state due to said operation suspending unit.

11. An electronic device in accordance with claim 10; wherein said operation initiating unit performs the initiation of operation of said control circuit when the amount of electrical energy output from said power generating unit exceeds an energy amount sufficient for reactivation for a predetermined duration.

12. An electronic device in accordance with claim 1, further comprising:

a carried state detecting unit for detecting whether or not said electronic device is in a carried state; and an operation initiating unit for initiating operation of said control circuit when a switch from a non-carried state to a carried state is detected by said carried state detecting unit under a condition in which the operation of said control circuit is in a suspended state due to said operation suspending unit.

13. An electronic device in accordance with claim 12, wherein the switch from said non-carried state to the carried state is made when the carried state continues for a predetermined duration after switching from a non-carried state to a carried state.

14. An electronic device in accordance with claim 1, further comprising:

an external operation input unit for a user to perform operations from outside, wherein said mode switching unit switches the operation mode from said drive mode to said power-saving mode based on the operating conditions of said external operation input unit.

15. An electronic device in accordance with claim 1, further comprising:

an external operation input unit for a user to perform operations from outside; and an operation initiating unit for initiating operation of said control circuit based on operating conditions of said external operation input under condition in which the operation of said control circuit is in a suspended state due to said operation suspending unit.

16. An electronic device in accordance with claim 1, wherein said driven unit has a time display unit for displaying the time.

17. An electronic device in accordance with claim 16, wherein said control circuit comprises a current time restoring unit for restoring the time display to the current time when the operating mode is switched from said power-saving mode to said drive mode by the mode switching unit.

18. An electronic device in accordance with claim 17, wherein said predetermined electrical energy amount is set to an electrical energy amount required to restore the current time from the power-saving mode using said current time restoring unit.

19. An electronic device in accordance with claim 17, wherein the amount of energy sufficient to perform restoration is set to a minimum amount required to enable time display using said time display unit by initiating the operation of said control circuit.

20. An electronic device in accordance with claim 17, wherein said time display unit comprises hands for displaying the time and a motor for driving said hands; and said current time restoring unit restores the motion of the hands by said motor by restoring them at a high-speed hand-moving speed which is higher than the normal hand-moving speed.

21. An electronic device in accordance with claim 1, wherein:

said control circuit comprises an oscillator circuit for generating a reference pulse; and said operation suspending unit suspends the operation of said control circuit by suspending the operation of the oscillator circuit.

22. An electronic device in accordance with claim 21, wherein said operation suspending unit suspends the supply of electrical energy to said oscillator circuit.

23. An electronic device in accordance with claim 1, wherein said control circuit comprises an oscillator circuit for generating a reference pulse, and a divider circuit for dividing the reference pulse output from said oscillator circuit; and said operation suspending unit suspends operation of said control circuit by suspending the operation of said oscillator circuit or said divider circuit.

24. An electronic device in accordance with claim 23, wherein said operation suspending unit comprises a regulated voltage generating circuit for generating a regulated voltage lower than the power supply voltage for driving at least one of the oscillator circuit and the divider circuit; and said operation suspending unit suspends the supply of electrical energy to said regulated voltage generating circuit.

25. A control method for an electronic device comprising:

a chargeable power supply unit for supplying electrical energy;

a driven unit;

a control circuit operated by the electrical energy supplied from said power supply unit, for generating control signals to control elements in said electronic device;

a drive unit operated by the electrical energy supplied from said power supply unit, for generating a drive signal in response to a part of said control signals while the electronic device is in a drive mode;

the control method comprising:

a mode switching step of switching an operating mode of said electronic device from said drive mode in which said driven unit is driven to a power-saving mode in which said driven unit is not driven; and then a drive suspending step of suspending operation of said control circuit when the amount of electrical energy stored in said power supply unit is determined to be smaller than a predetermined amount of electrical energy.

26. A control method for an electronic device in accordance with claim 25, wherein:

said power supply unit comprises a power generating device for converting external energy into electrical energy, and a power storing device for storing electrical energy supplied from said power generating device and supplying said electrical energy to said control circuit; and said method further comprises a power generation state detecting step of determining whether or not power is being generated by the power generating device; and said mode switching step switches the operating mode of said electronic device from the power-saving mode to the drive mode when power generation by the power generating device is detected in said power generation state detecting step.

27. A control method for an electronic device in accordance with claim 26, wherein:

said power generation state detecting step comprises an energy amount determining step for determining whether or not the amount of electrical energy outputted from said power generating device has exceeded a criterion energy amount; and a power generation time determining step of determining whether or not the duration over which the electrical energy amount exceeding the criterion energy amount as determined in said energy amount determining step exceeds a criterion time value.

28. A control method for an electronic device in accordance with claim 25, wherein:

said method further comprises a carried state detecting step for detecting whether or not the electronic device is being carried; and said mode switching step comprises a step of switching the operating mode from said drive mode to said power-saving mode when said electronic device is detected to be in a non-carried state in said carried state detecting step, and the time over which said electronic device is in a non-carried state continues for a predetermined time, and a step of switching the operating mode from said power-saving mode to said drive mode when a switch from the non-carried state to a carried state is detected in said carried state detecting step.

29. A control method for an electronic device in accordance with claim 25, further comprising:

an electrical energy amount detecting step for detecting an amount of electrical energy supplied from said power supply unit, and wherein said drive suspending step comprises a step of determining whether the electrical energy amount capable of being supplied by said power supply unit detected by said electrical energy detecting step is smaller than a predetermined electrical energy amount required to restore the operating mode of said driven unit from said power-saving mode to said drive mode.

30. A control method for an electronic device in accordance with claim 25, wherein:

said power supply unit comprises a power generating device for converting external energy into electrical energy, and a power storing device for storing electrical energy supplied from said power generating device, and supplying said electrical energy to said oscillator circuit, said control circuit and said drive circuit; and said method comprises a power generation state detecting step of detecting whether or not said power generating device is in a power generation state; and further comprises an operation initiating step of initiating operation of the control circuit when said power generating device initiating power generation is detected in said power generation state detecting step under a condition in which the operation of said control circuit is in a suspended state.

31. A control method for an electronic device in accordance with claim 25, wherein:

said power supply unit comprises a power generating device for converting external energy into electrical energy, and a power storing device for storing electrical energy supplied from said power generating device, and supplying said electrical energy to said control circuit; and said method comprises a carried state detecting step for detecting whether or not said electronic device is in a carried state; and said method further comprises an operation initiating step of initiating operation of the control circuit when said electronic device is detected as having switched from a non-carried state to a carried state in said carried state detecting step under a condition in which the operation of said control circuit is in a suspended state.

* * * * *

UNITED STATES PATENT AND TRADEMARK OFFICE
CERTIFICATE OF CORRECTION

PATENT NO. : 6,693,851 B1
DATED : February 17, 2004
INVENTOR(S) : Teruhiko Fujisawa et al.

It is certified that error appears in the above-identified patent and that said Letters Patent is hereby corrected as shown below:

Title page,
Item [30], Foreign Application Priority Data, please change "11-134961" to -- 11-134761 --

Signed and Sealed this

Twenty-second Day of June, 2004

JON W. DUDAS
*Acting Director of the United States Patent and Trademark Office*